US012776465B2

(12) United States Patent
Gennissen et al.

(10) Patent No.: US 12,776,465 B2
(45) Date of Patent: Oct. 27, 2026

(54) MULTI-SWITCH CONTACTOR ASSEMBLY WITH A PRE-CHARGE RELAY

(71) Applicant: SENSATA TECHNOLOGIES, INC., Attleboro, MA (US)

(72) Inventors: Paulus Thomas Johannes Gennissen, Markelo (NL); Daniele Suzzi, Gutenberg (AT); Ernie Johannus Antonius Schoot Uiterkamp, Heeten (NL); Engbertus Berkel, Wierden (NL)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 219 days.

(21) Appl. No.: 18/819,882

(22) Filed: Aug. 29, 2024

(65) Prior Publication Data

US 2024/0420910 A1 Dec. 19, 2024

Related U.S. Application Data

(63) Continuation-in-part of application No. 18/593,781, filed on Mar. 1, 2024, which is a continuation-in-part of application No. PCT/US2023/063658, filed on Mar. 3, 2023.

(60) Provisional application No. 63/585,684, filed on Sep. 27, 2023, provisional application No. 63/368,249, filed on Jul. 12, 2022, provisional application No. 63/316,116, filed on Mar. 3, 2022.

(51) Int. Cl.
*H01H 50/64* (2006.01)

(52) U.S. Cl.
CPC ....... *H01H 50/64* (2013.01); *H01H 2231/026* (2013.01)

(58) Field of Classification Search
CPC ......................... H01H 50/64; H01H 2231/026
See application file for complete search history.

(56) References Cited

U.S. PATENT DOCUMENTS

| | | | |
|---|---|---|---|
| 2013/0278245 A1 | 10/2013 | Loy et al. |
| 2024/0203676 A1 | 6/2024 | Schoot Uiterkamp et al. |
| 2024/0420910 A1 | 12/2024 | Gennissen et al. |

FOREIGN PATENT DOCUMENTS

| | | | |
|---|---|---|---|
| CA | 2990330 C | | 2/2017 |
| CN | 203825132 U | * | 9/2014 |

(Continued)

OTHER PUBLICATIONS

Extended European Search Report, EP24180304.8, Feb. 25, 2025, 12 pages.

(Continued)

*Primary Examiner* — Mohamad A Musleh

(57) ABSTRACT

In an embodiment, a multi-switch contactor assembly with a pre-charge system is disclosed. The multi-switch contactor further includes an array of switches and an actuator assembly configured to actuate each switch of the array of switches. In this embodiment, the array of switches includes a first switch configured to connect a first battery device to a circuit and a second switch configured to connect a second battery device to the circuit. The array of switches also includes a third switch configured to connect the first battery device and the second battery device in series to the circuit and a fourth switch configured to connect a pre-charge resistor to at least one of the first battery device and the second battery device.

20 Claims, 16 Drawing Sheets

(56) References Cited

FOREIGN PATENT DOCUMENTS

| | | | | |
|---|---|---|---|---|
| DE | 1186936 | B | 2/1965 | |
| DE | 102013205354 | B | 7/2014 | |
| DE | 102013222495 | A1 * | 5/2015 | ............. H01H 51/20 |
| DE | 102019204441 | A1 | 10/2020 | |
| DE | 102022205450 | | 9/2023 | |
| EP | 2711964 | A1 | 3/2014 | |
| EP | 4531067 | A1 | 4/2025 | |
| FR | 3025933 | A1 | 3/2016 | |
| WO | 2023168388 | A | 9/2023 | |
| WO | 2023168388 | A1 | 9/2023 | |

OTHER PUBLICATIONS

Extended European Search Report, EP25199179.0, Jan. 29, 2026, 7 pages.

International Search Report and Written Opinion, PCT/US2023/063658, Jul. 28, 2023, 10 pages.

* cited by examiner

1000

1100

1101 1102 1103 1104 1105 1106

| Angle | State | Bank A | Series | Bank B | Pre-Charge |
|---|---|---|---|---|---|
| 0 | Drive/Charge (800V) | Open | Closed | Open | Closed |
| 45 | Pre-Charge (800V) | Open | Open | Open | Closed |
| 90 | Open | Open | Open | Open | Open |
| 135 | Bank A Charge (400V) | Closed | Open | Open | Open |
| 180 | A+B Charge (400V) | Closed | Open | Closed | Open |
| 225 | Bank B Charge (400V) | Open | Open | Closed | Open |
| 270 | Open | Open | Open | Open | Open |
| 315 | Pre-Charge (800V) | Open | Open | Open | Closed |

FIG. 11

MULTI-SWITCH CONTACTOR ASSEMBLY WITH A PRE-CHARGE RELAY

BACKGROUND

Electromechanical switching devices, such as contactors and relays, are designed to carry a certain amount of electrical current for certain periods of time. Such devices are particularly important in electric vehicles. Typically, electric vehicles have multiple electromechanical switches that open or close high current paths between the battery packs and the electrical system. These switches are controlled by different actuation mechanisms. To prevent short circuit of the battery packs, electromechanical switching elements of the battery configuration contactor must withstand mechanical shock and coordinate multiple switches to change a battery connection configuration.

SUMMARY

To avoid unwanted switch combinations, a multi-switch contactor assembly is provided in which a single mechanical actuation mechanism operates multiple switches in such a way that dangerous switch combinations are mechanically impossible. In a particular example, multiple switches may be actuated by multiple cams that are coupled to the same cam shaft. Different combinations of switch states (open or closed) among the multiple switches are realized through rotation of the cam shaft. This provides a limited set of configuration states controllable by a single actuator. Different cam shapes or different orientations of the cams on the cam shaft may be used to realize the different switch state combinations. This provides low contact resistance and high contact force while not requiring power to keep the switches in a particular state.

In accordance with embodiments of the present disclosure, contact force is further increased by leveraging Loretz forces that act on the moveable contact due to the shape and orientation of the fixed contact and the moveable contact. In some examples, the shape and orientation of the fixed contacts and moveable contacts are such that a fixed contact and a moveable contact create a conductor that loops back on itself. In some implementations, the fixed contact forms a C-shape or other partial loop shape and the moveable contact is oriented to contact an inner surface of the fixed contact within the loop. In the presence of high current through the fixed contact and the moveable contact, Lorentz forces acting on the moveable contact repel the moveable contact toward the fixed contact, thus increasing the contact force. In some implementations, the multi-switch contactor assembly includes a pre-charge switch. These implementations eliminate the need for a separate pre-charge circuit.

In an embodiment, a multi-switch contactor assembly with a pre-charge system is disclosed that includes an array of switches and an actuator assembly configured to actuate each switch of the array of switches. In this embodiment, the array of switches includes a first switch configured to connect a first battery device to a circuit and a second switch configured to connect a second battery device to the circuit. The array of switches also includes a third switch configured to connect the first battery device and the second battery device in series to the circuit and a fourth switch configured to connect a pre-charge resistor to at least one of the first battery device and the second battery device.

In another embodiment, a system is disclosed having a plurality of components including a first battery device and a second battery device. The system also includes a vehicle power distribution circuit and a multi-switch contactor assembly connecting the plurality of components and the vehicle power distribution circuit. In this embodiment, the multi-switch contactor assembly includes an array of switches and an actuator assembly configured to actuate each switch of the array of switches. The array of switches includes a first switch configured to connect the first battery device to a circuit and a second switch configured to connect the second battery device to the circuit. The array of switches also includes a third switch configured to connect the first battery device and the second battery device in series to the circuit and a fourth switch configured to connect a pre-charge resistor to at least one of the first battery device and the second battery device.

In another embodiment, a method for operating a multi-switch contactor assembly with a pre-charge system is disclosed. The multi-switch contactor assembly further includes an array of switches and an actuator assembly including a shaft and configured to actuate each switch of the array of switches. The array of switches includes a first switch configured to connect a first battery device to a circuit and a second switch configured to connect a second battery device to the circuit. The array of switches also includes a third switch configured to connect the first battery device and the second battery device in series to the circuit and a fourth switch configured to connect a pre-charge resistor to at least one of the first battery device and the second battery device. The method includes rotating the shaft of the actuator assembly from an all-open position in which the first switch, the second switch, the third switch, and the fourth switch are open to a pre-charge position in which the fourth switch is closed and the first switch, the second switch, and the third switch are open. The method also includes rotating the shaft from the pre-charge position to a series position in which the fourth switch is closed and the third switch is closed. The method also includes rotating the shaft from the series position to the pre-charge position and rotating the shaft from the pre-charge position to the all-open position.

BRIEF DESCRIPTION OF THE DRAWINGS

FIG. 11 is a table of switch states for another multi-switch contactor assembly in accordance with at least one embodiment of the present disclosure.

DETAILED DESCRIPTION

Figure 1:
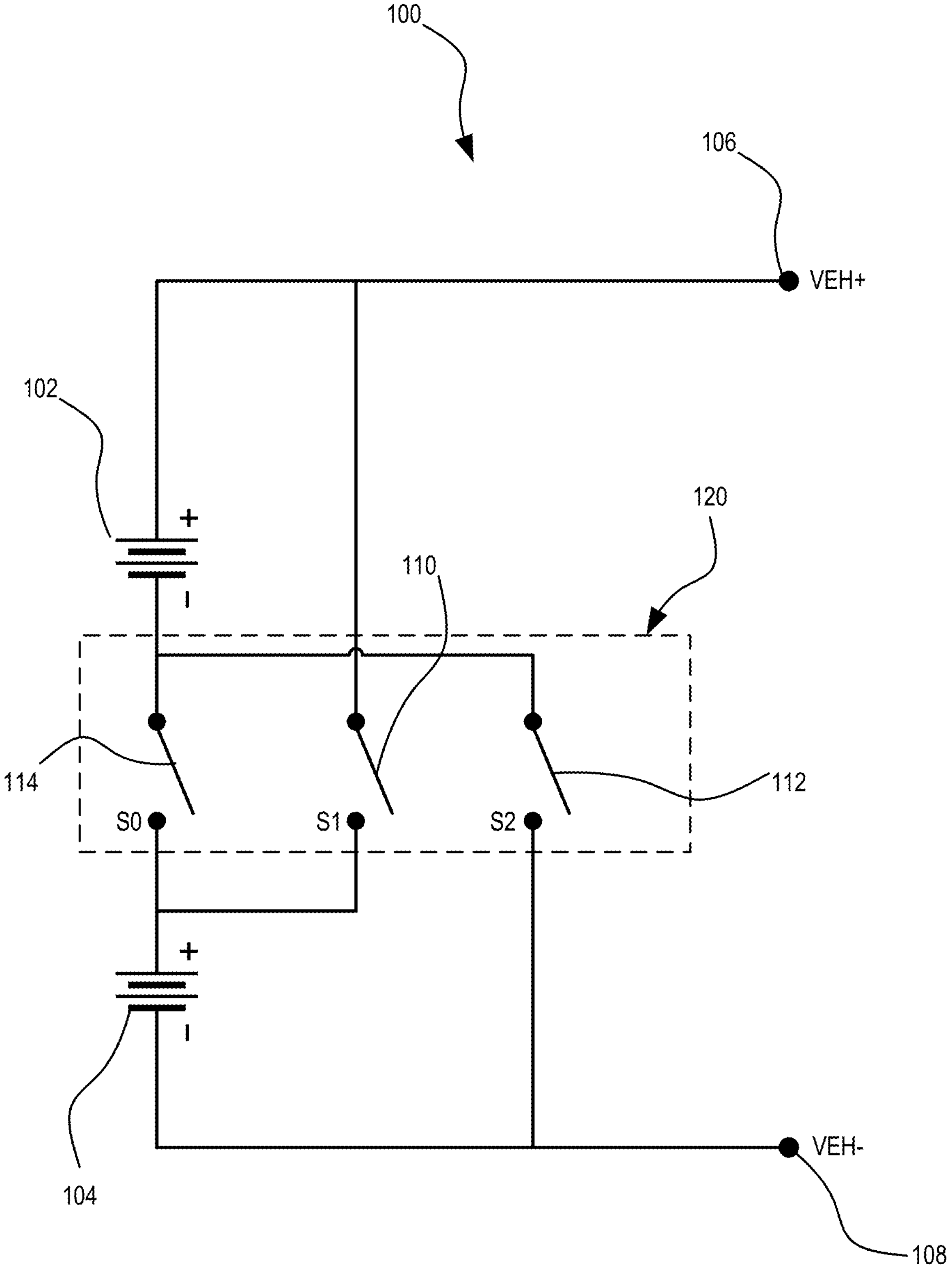
FIG. 1 is a circuit schematic for a multi-switch contactor assembly in accordance with at least one embodiment of the present disclosure.

Connecting and disconnecting electrical circuits is as old as electrical circuits themselves and is often utilized as a method of switching power to a connected electrical device between "on" and "off" states. An example of one device commonly utilized to connect and disconnect circuits is a contactor, which is electrically connected to one or more devices or power sources. A contactor is configured such that it can change between "open" and "closed" states to interrupt or complete a circuit to control electrical power to and from a device.

As society advances, various innovations have resulted in electrical systems and electronic devices becoming increasingly common. An example of such innovations includes recent advances in electrical automobiles, which are becoming the energy-efficient standard and will likely replace most traditional petroleum-powered vehicles. In such expensive and routinely used electrical devices, overcurrent protection is particularly applicable to prevent device malfunction and prevent permanent damage to the devices. Furthermore, overcurrent protection can prevent safety hazards, such as electrical shock or electrical fires. These modern improvements to electrical systems and devices require improved solutions to increase the safety, reliability, and efficiency of mechanisms for triggering contactors.

Described herein are different embodiments of contact assemblies having certain components, or portions thereof, that are formed integral to one another to improve the operation characteristics and increase operational reliability and safety. The present invention also provides for new features of components of the contact assemblies, with these features providing the desired operational characteristics, performance and safety. Embodiments of the invention are also directed to contactors (i.e., electrical switching devices) utilizing the contactor assemblies according to the present invention, and to electrical circuits and systems utilizing the electrical switching devices according to the present invention.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Exemplary methods and apparatuses for a multi-switch contactor assembly in accordance with the present disclosure are described with reference to the accompanying drawings, beginning with FIG. 1. FIG. 1 sets forth a battery configuration contactor circuit 100 employing a multi-switch contactor assembly in accordance with at least one embodiment of the present disclosure. The battery configuration contactor may be employed in an electric vehicle for connecting multiple battery packs to a vehicle power distribution system for driving the electric vehicle as well as for charging the battery packs. In this example, a first switch 110 (referred to herein as 'S1') is operable to open and close a connection between the positive terminal of a first battery pack 104 and a positive terminal 106 of a vehicle power distribution system. The negative terminal of the first battery pack 104 is connected to a negative terminal 108 of the vehicle power distribution system. In this example, a second switch 112 (referred to herein as 'S2') is operable to open and close a connection between the negative terminal of a second battery pack 102 and the negative terminal 108 of the vehicle power distribution system. A positive terminal of the second battery pack 102 is connected to the positive terminal 106 of the vehicle power distribution system. In this example, the third switch 114 (referred to herein as 'S0') is operable to open and close a series connection of the battery packs 102, 104. When the first switch 110 is closed, the first battery pack 104 is directly connected to the vehicle power distribution system. When the second switch 112 is closed, the second battery pack 102 is directly connected to the vehicle power distribution system. When the first switch 110 and the second switch 112 are closed, both battery packs 102, 104 are connected in parallel to the vehicle power distribution system. When the third switch 114 is closed, both battery packs 102, 104 are connected in series to the vehicle power distribution system. However, closing either the first switch 110 or the second switch 112 while the third switch 114 is closed may cause a direct short circuit of the battery packs 102, 104, which may weld the contactors of the switches and/or cause harm to the battery packs 102, 104. To prevent this, there is a high requirement on switch contactors to withstand mechanical shock. Solenoid contactor coils require constant power when enabled.

Thus, in accordance with some embodiments of the present disclosure, a battery configuration contactor utilizes a multi-switch contactor assembly 120 in which switches S0, S1, and S2 are mechanically linked to prevent switch S0 from being opened while switch S1 or switch S2 is closed, and vice versa. A multi-switch contactor assembly in accordance with at least one embodiment of the present disclosure comprises an array of switches (e.g., switches S0, S1, S2) including a first switch implemented by a first moveable contact and at least one first fixed contact, the first switch configured to change a switch state between an open state and a closed state; a second switch implemented by a second moveable contact and at least one fixed second contact, the second switch configured to change a switch state between an open state and a closed state; and a third switch implemented by a third moveable contact and at least one third fixed contact, the third switch configured to change a switch state between an open state and a closed state. The multi-switch contactor assembly further includes an actuator assembly configured to actuate the first moveable contact, the second moveable contact, and the third moveable contact. The actuator assembly includes a shaft, wherein the respective switch states of the three switches are changed in dependence upon rotation of the shaft. Although a multi-switch contactor assembly is described in the following examples as including three switches, the principles of the present disclosure are applicable to a multi-switch contactor assembly comprising fewer than three switches or more than three switches. That is, a single actuator is employed to change multiple switches to differing switch states such that some combinations of switch states are mechanically prohibited. As will be shown in more detail below, mechanical linkage of the contactor switches can be achieved with low contact resistance, no levitation, no hold power, and high contact forces.

Figure 2A:
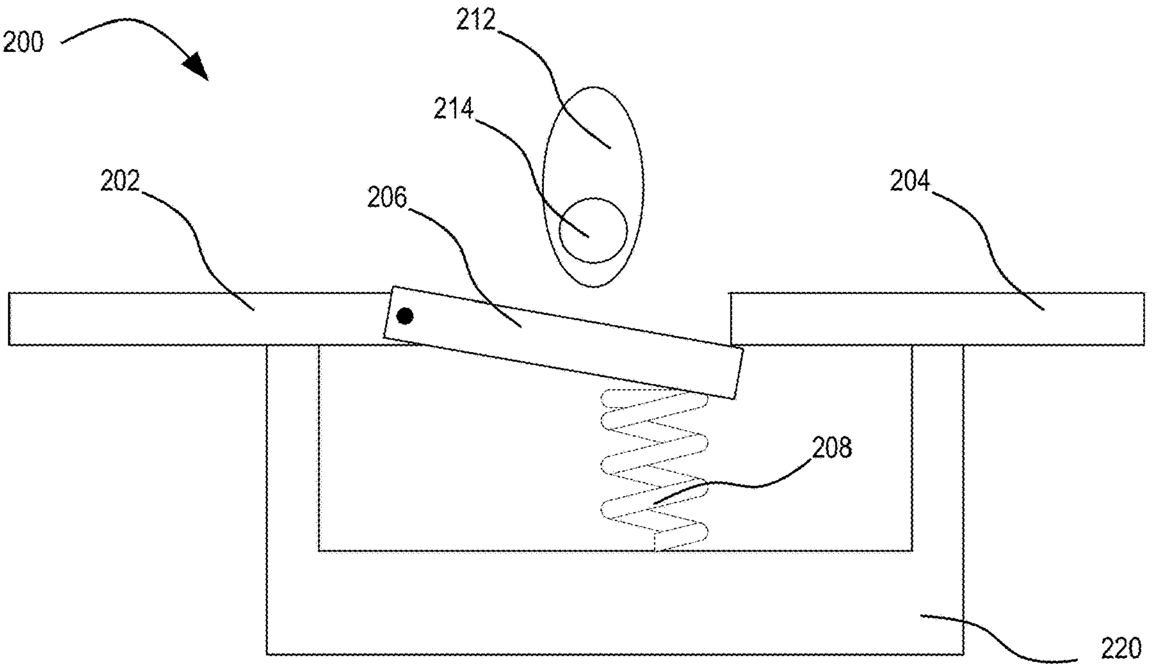
FIG. 2A is a diagram of a first state of an example switch assembly for a multi-switch contactor assembly in accordance with at least one embodiment of the present disclosure.
Figure 2B:
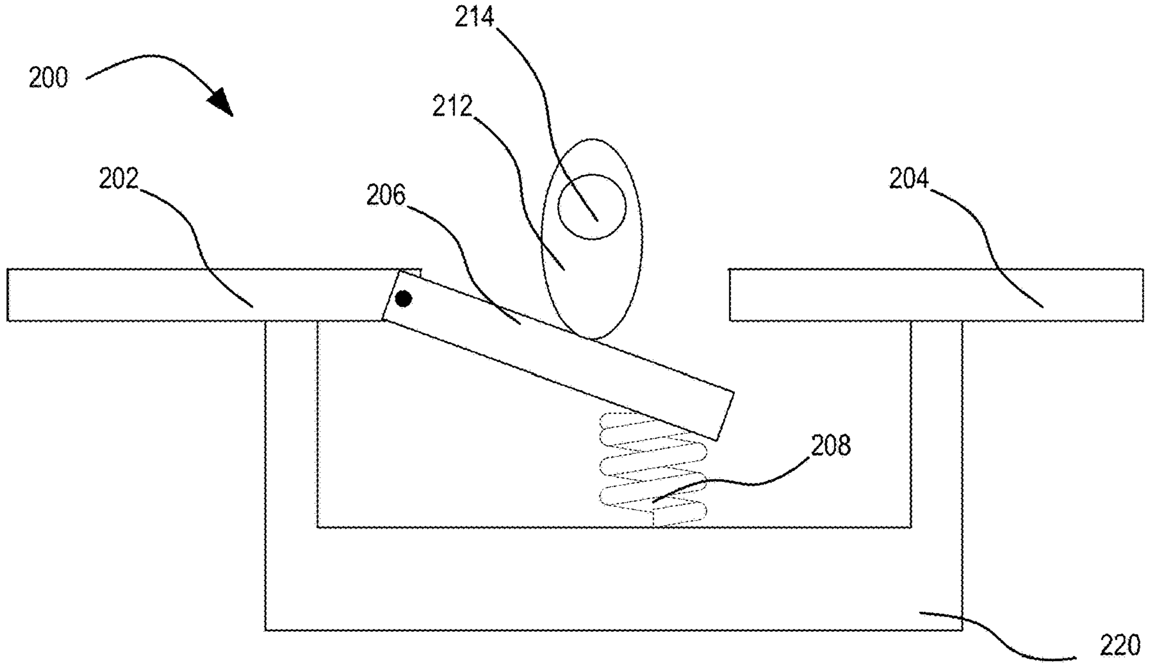
FIG. 2B is another state of the example switch assembly of FIG. 2A.

For further explanation, FIGS. 2A and 2B illustrate an example of one switch assembly 200 for a multi-switch contactor assembly in accordance with at least one embodiment of the present disclosure. The switch assembly 200 includes fixed contacts 202, 204 and a moveable contact 206. The moveable contact 206 is coupled at one end to a fixed contact 202. The moveable contact 206 may be rotatable, flexible, or deformable. An opposite end is coupled to a spring 208 that is held by a support structure 220 (e.g., a contactor housing). In a first state, the moveable contact 206 is held in the closed position by the spring 208. To transition to a second state, the moveable contact 206 is moved through application of force to the moveable contact 206 by a rotatable cam 212, causing separation of the moveable contact 206 from the fixed contact and compression of the spring, thus placing the contactor assembly 200 in the open state. To transition the switch assembly 200 to the second state, the cam 212 is rotated out of contact with the moveable contact 206, allowing the spring 208 to apply a force to the moveable contact 206 to move into contact with the fixed contact 204, thus placing the switch assembly in the closed state. The cam 212 rotates via a shaft 214. In some examples, multiple cams 212 may be coupled to the same shaft 214, thus providing a mechanical link to the actuation of multiple moveable contacts corresponding to multiple switches of the multi-switch contactor assembly.

Figure 3:
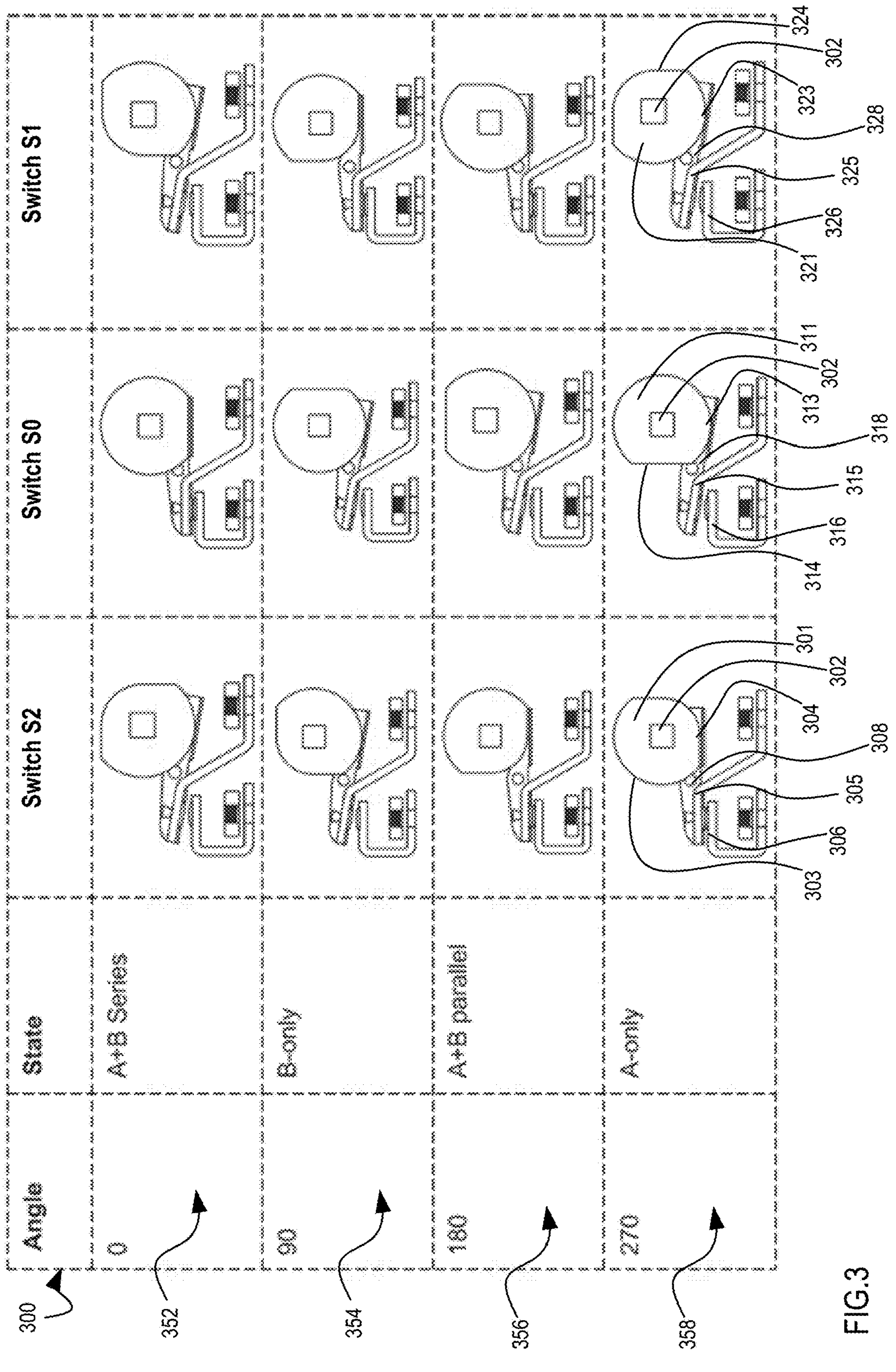
FIG. 3 is a diagram of configuration states for a multi-switch contactor assembly in accordance with at least one embodiment of the present disclosure.
Figure 4:
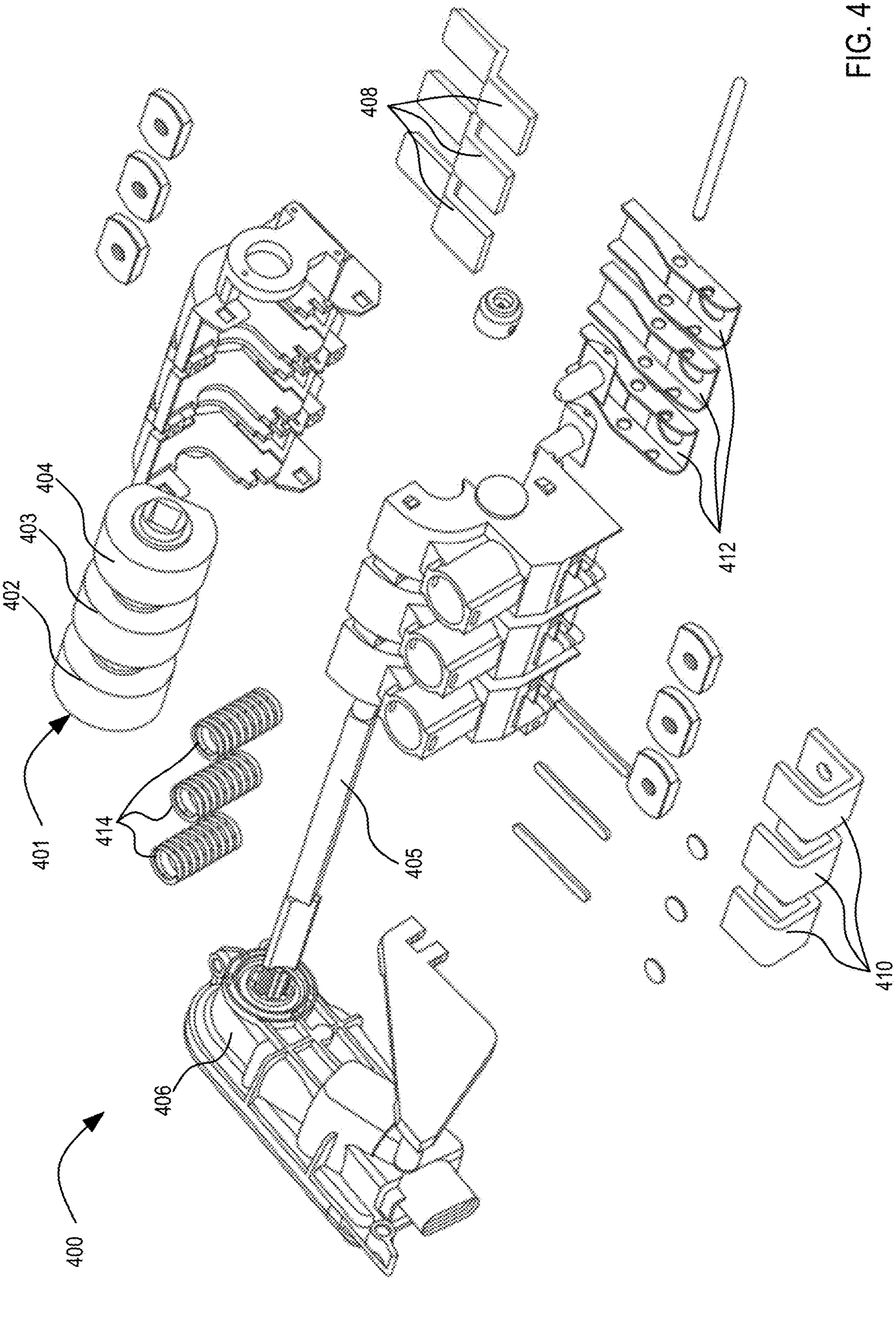
FIG. 4 is an exploded view of a multi-switch contactor assembly in accordance with at least one embodiment of the present disclosure.

For further reference, FIG. 3 sets forth diagram 300 of configuration states for a multi-switch contactor assembly in accordance with at least one embodiment of the present disclosure. The diagram 300 shows the state of three switch assemblies S0, S1, S2 based on the rotation of a cam shaft 302. To aid illustration, three switch assemblies S0, S1, S2 may be comprised in a battery configuration contactor configured to connect battery pack A and battery pack B to a vehicle power distribution system. In such an example, battery pack A may correspond to battery pack 102 of FIG. 1 and battery pack B may correspond to battery pack 104 of FIG. 1, where switch assembly S2 corresponds to switch 112, switch assembly S1 corresponds to switch 110, and switch assembly S0 corresponds to switch 114 in FIG. 1. However, it should be appreciated that the configuration shown in FIG. 3 may be applied to other vehicle contactors such as a fast charge contactor, an auxiliary or utility contactor, as well as contactors for applications other than vehicles. Switch assemblies S0, S1, S2 may be arrayed in an orientation parallel to the axis of cam shaft 302 (e.g., as shown in FIG. 4), such that rotation of the cam shaft changes the switch state of at least one of the switches. In this example, a 180 degree rotation changes the switch states of all of the switches. Three cams 301, 311, 321 are coupled to the cam shaft 302, which together form an actuation assembly for all of the switch assemblies.

In the example of FIG. 3, a first switch assembly S2 includes a fixed bus bar 306 (i.e., a fixed contact) and a deformable bus bar 305 (i.e., a moveable contact). Switch assembly S2 further includes a rocker 308 coupled to the deformable bus bar 305. In this example, switch assembly S2 is a 'normally closed' switch in that the deformable bus bar 305 is in contact with the fixed bus bar 306 unless the rocker 308 is actuated to deform the deformable bus bar 305 such that contact between the deformable bus bar 305 and the fixed bus bar 306 is broken, thereby opening the switch. In some examples, the rocker 308 is spring loaded to hold the deformable bus bar 305 in contact with the fixed bus bar 306 unless a force applied to the rocker 308 by the cam 301 exceeds a spring bias force. The rocker 308 is actuated by the cam 301, which includes a substantially round portion 303 and one or more substantially flat portions 304. When the substantially round portion 303 of the cam 301 engages the rocker 308, one end of the rocker proximate to the cam 301 is forced downward thus forcing the other end of the rocker 308 and the deformable bus bar 305 upward, moving the deformable bus bar 305 out of contact with the fixed bus bar 306. When the substantially flat portion 304 of the cam 301 engages the rocker 308, the end of the rocker 308 proximate to the cam 301 is allowed to return to a closed state position in which the rocker 308 facilitates contact between the deformable bus bar 305 and the fixed bus bar 306. In this example, cam 301 include two substantially flat portions 304, one corresponding to a closed switch state for a direct connection of battery pack A only and one corresponding to a closed switch state for parallel connection of battery pack A and battery pack B. Thus, rotation of the cam 301 opens and closes the switch S2 depending on the rotation of the cam shaft 302 and whether the rocker 308 is engaged by the substantially round portion 303 or the substantially flat portion of the cam. In alternative embodiments, switch S2 may be arranged a 'normally open' switch in which the cam 301 actuates the rocker 308 to move the deformable bus bar 305 into contact with the fixed bus bar 306.

In the example of FIG. 3, like switch assembly S2, second switch assembly S1 includes a fixed bus bar 326 (i.e., a fixed contact) and a deformable bus bar 325 (i.e., a moveable contact). Switch assembly S1 further includes a rocker 328 coupled to the deformable bus bar 325. In this example, switch assembly S1 is a 'normally closed' switch in that the deformable bus bar 325 is in contact with the fixed bus bar 326 unless the rocker 328 is actuated to deform the deformable bus bar 325 such that contact between the deformable bus bar 325 and the fixed bus bar 326 is broken, thereby opening the switch. In some examples, the rocker 328 is spring loaded to hold the deformable bus bar 325 in contact with the fixed bus bar 326 unless a force applied to the rocker 328 by the cam 321 exceeds a spring bias force. The rocker 328 is actuated by the cam 321, which includes a substantially round portion 323 and one or more substantially flat portions 324. When the substantially round portion 323 of the cam 321 engages the rocker 328, one end of the rocker proximate to the cam 321 is forced downward thus forcing the other end of the rocker 328 and the deformable bus bar 325 upward, moving the deformable bus bar 325 out of contact with the fixed bus bar 326. When the substantially flat portion 324 of the cam 321 engages the rocker 328, the end of the rocker 328 proximate to the cam 321 is allowed to return to a closed state position in which the rocker 328 facilitates contact between the deformable bus bar 325 and the fixed bus bar 326. In this example, cam 321 include two substantially flat portions 324, one corresponding to a closed switch state for a direct connection of battery pack B only and one corresponding to a closed switch state for parallel connection of battery pack A and battery pack B. Thus, rotation of the cam 321 opens and closes the switch S1 depending on the rotation of the cam shaft 302 and whether the rocker 328 is engaged by the substantially round portion 323 or the substantially flat portion of the cam. In alternative embodiments, switch S1 may be arranged a 'normally open' switch in which the cam 321 actuates the rocker 328 to move the deformable bus bar 325 into contact with the fixed bus bar 326.

In the example of FIG. 3, like switch assembly S2, third switch assembly S0 includes a fixed bus bar 316 (i.e., a fixed contact) and a deformable bus bar 315 (i.e., a moveable contact). Switch assembly S0 further includes a rocker 318 coupled to the deformable bus bar 315. In this example, switch assembly S0 is a 'normally closed' switch in that the deformable bus bar 315 is in contact with the fixed bus bar 316 unless the rocker 318 is actuated to deform the deformable bus bar 315 such that contact between the deformable bus bar 315 and the fixed bus bar 316 is broken, thereby opening the switch. In some examples, the rocker 318 is spring loaded to hold the deformable bus bar 315 in contact with the fixed bus bar 316 unless a force applied to the rocker 318 by the cam 311 exceeds a spring bias force. The rocker 318 is actuated by the cam 311, which includes a substantially round portion 313 and one or more substantially flat portions 314. When the substantially round portion 313 of the cam 311 engages the rocker 318, one end of the rocker proximate to the cam 311 is forced downward thus forcing the other end of the rocker 318 and the deformable bus bar 315 upward, moving the deformable bus bar 315 out of contact with the fixed bus bar 316. When the substantially flat portion 314 of the cam 311 engages the rocker 318, the end of the rocker 318 proximate to the cam 311 is allowed to return to a closed state position in which the rocker 318 facilitates contact between the deformable bus bar 315 and the fixed bus bar 316. In this example, cam 311 include one substantially flat portion 314 corresponding to a closed switch state for series connection of battery pack A and battery pack B. Thus, rotation of the cam 311 opens and closes the switch S0 depending on the rotation of the cam shaft 302 and whether the rocker 318 is engaged by the substantially round portion 313 or the substantially flat portion of the cam. In alternative embodiments, switch S0 may be arranged a 'normally open' switch in which the cam 311 actuates the rocker 318 to move the deformable bus bar 315 into contact with the fixed bus bar 316.

The diagram 300 of multi-switch contactor assembly configuration states includes four distinct states. In a first state 352, the cam shaft is at 0 degrees of rotation. Cams 301, 321 apply a force to rockers 308, 328 to ensure that switch assemblies S2, S1 are in an open state when the rocker 318 of switch assembly S0 engages the substantially flat portion 314 of cam 311 and allowing switch assembly S0 to close at 0 degrees rotation. Thus, a parallel or direct connection of battery pack A and battery pack B is mechanically prevented while switch assembly S0 connects battery pack A and battery pack B in series.

In a second state 354, the cam shaft 302 is at 90 degrees (e.g., counterclockwise) rotation relative to state 352. Cam 311 applies a force to the rocker 318 to open the switch assembly S0 before the rocker 328 of switch assembly S1 engages a substantially flat portion 324 of cam 321 of switch assembly S1 at 90 degrees rotation. When the rocker 328 engages the substantially flat portion 324 of the cam 321, the switch assembly S1 closes. Thus, a series connection of battery pack A and battery pack B is mechanically prevented while switch assembly S1 connects battery pack B directly to the power distribution system. Cam 301 continues to apply a force to rocker 308 to retain switch assembly S2 in the open state.

In a third state 356, the cam shaft 302 is at 180 degrees rotation (e.g., counterclockwise) relative to state 352. Cam 311 continues to apply a force to the rocker 318 to keep the switch assembly S0 in the open state. The rocker 328 of switch assembly S1 engages a second substantially flat portion 324 of cam 321 of switch assembly S1 at 180 degrees rotation such that the switch assembly S1 is maintained in the closed state. At the same time, rocker 308 of switch assembly S2 engages a first substantially flat portion 304 of the cam 301 of switch assembly S2, thus allowing switch assembly S2 to transition to the closed state. Thus, a series connection of battery pack A and battery pack B is mechanically prevented while switch assembly S1 and switch assembly S2 connect battery pack A and battery pack B in parallel to the power distribution system.

In a fourth state 358, the cam shaft is at 270 degrees rotation (e.g., counterclockwise) or −90 degrees rotation (e.g., clockwise) relative to state 352. Cam 311 continues to apply a force to the rocker 318 to keep the switch assembly S0 in the open state. Cam 321 applies a force to the rocker 328 to keep the switch assembly S1 in the open state. At 270 degrees rotation rocker 308 of switch assembly S2 engages a second substantially flat portion of the cam 301 of switch assembly S2, thus allowing switch assembly S2 to transition to the closed state. Thus, a series connection of battery pack A and battery pack B is mechanically prevented while switch assembly S2 connects battery pack A directly to the power distribution system.

In some examples, as shown in FIG. 3, the state of switch assembly S1 may be maintained in the closed state while the switch assembly S2 transitions to the closed state between 90 and 180 degrees. In other examples, a break-before-make arrangement is employed such that all switch assemblies S0, S1, S2 are in the open state when rotation of the cam shaft is not at either 0, 90, 180, or 270 (−90) degrees rotation. In some examples, a position sensor is used to determine an absolute rotation of the cam shaft. Thus, the multi-switch contactor assembly only has four distinct states where at least one battery pack is connected to the power distribution system, and where a series connection of the battery packs is mechanically prevented when a direct or parallel connection of the battery packs is made.

It will be appreciated that other cam shapes may be utilized instead of a cam having round portions and flat portions. For example, a notch may be employed instead of a flat façade. In other examples, the switch assemblies may comprise 'normally open' switches, where a lobe or other protruding actuation member applies a force on the deformable contact to make contact with the fixed contact and closed the switch. In some variations, combinations of 'normally open' and 'normally closed' switches may be used in the same array of switches.

It will be appreciated that two or more cams having different cam shapes may be employed to realize different switch states in the corresponding switches. Similarly, two or more cams having the same shape but different orientations on the cam shaft may be employed to realize different switch states in the corresponding switches. In some cases, two cams may have the same shape and the same orientation on the cam shaft such that the cams actuate the same switch state on the corresponding switches (e.g., to reduce the current per contact). Thus, the multiple cams corresponding to the multiple switches may vary by shape, orientation, or alignment, where all cams are actuated by the same cam shaft.

It will be further appreciated that a deformable bus bar may be replaced with a fixed bus bar coupled to a rotatable or pivotable moveable contact. The flexible bus bar may also be replaced with a braided cable.

It will be further appreciated that the multi-switch contactor assembly in accordance with FIGS. 2A, 2B, and 3 may be applied in a battery configuration contactor as well as other devices constructed as above with different cam shape to enable high voltage high current connections that require low contactor resistance, like fast charging contactors, or that require no device current consumption, like axillary contactors used, for example, in vehicle to grid systems.

In view of the foregoing, a multi-switch contactor assembly in accordance with FIGS. 2A, 2B and 3 is provided in which 1) a single mechanical actuation mechanism operates all switches in such a way that dangerous switch combinations are mechanically impossible; 2) there are only four possible main states: series, only battery A connected, only battery B connected, A+B connected parallel, and intermediate states may be defined in which all contacts are open; 3) the actuator can move in forward and reverse direction to allow either the connection A only or B only to be made first after a series or parallel configuration; 4) the actuator assembly does not draw any power once the desired connection state is achieved; 5) a very high contact force (e.g., 100N) enabling very low device resistance (e.g., <50 uOhm) and high levitation currents (>25 kA) is provided; 6) contact can be made using a single contact and flexible bus bars, or a double moveable contact using a rigid contact.

FIG. 4 sets forth an exploded view of an example multi-switch contactor assembly 400 in accordance with at least one embodiment of the present disclosure. The example contactor assembly 400 includes a cam assembly 401 including three cams 402, 403, 404 that are coupled to a cam shaft 405, where rotation of the cam shaft is driven by a motor 406. The contactor assembly includes three switch assemblies each comprising a fixed contact 410 and a deformable contact 408. The cams 402, 403, 404 act on respective rockers 412 to deform respective deformable contacts 408 and open the respective switches. When a rocker 412 is engaged by a flat façade of a cam, a bias spring 414 forces the rocker to a closed state position in which the deformable contact 408 is held in contact with the fixed contact 410. When the rocker 412 is engaged by the round portion of the cam, the cam applies a force on the rocker 412 that overcomes the bias force of the spring 414, thus forcing the rocker 412 into an open state position and causing the rocker 412 to bend the deformable contact 408 out of contact with the fixed contact 410. In some examples, the multi-switch contactor assembly 400 includes a position sensor (not shown) to detect the rotation of the cam shaft 405. The position sensor provides the absolute angle of the cam shaft such that the cam shaft can be rotated to a new setpoint to change switch states. The position sensor may be, for example, a non-contacting position sensor and a contacting device (e.g., a potentiometer). The signal of the position sensor can be used to both control the cam shaft position and to communicate the state of the contacts to the vehicle controller.

Figure 5:
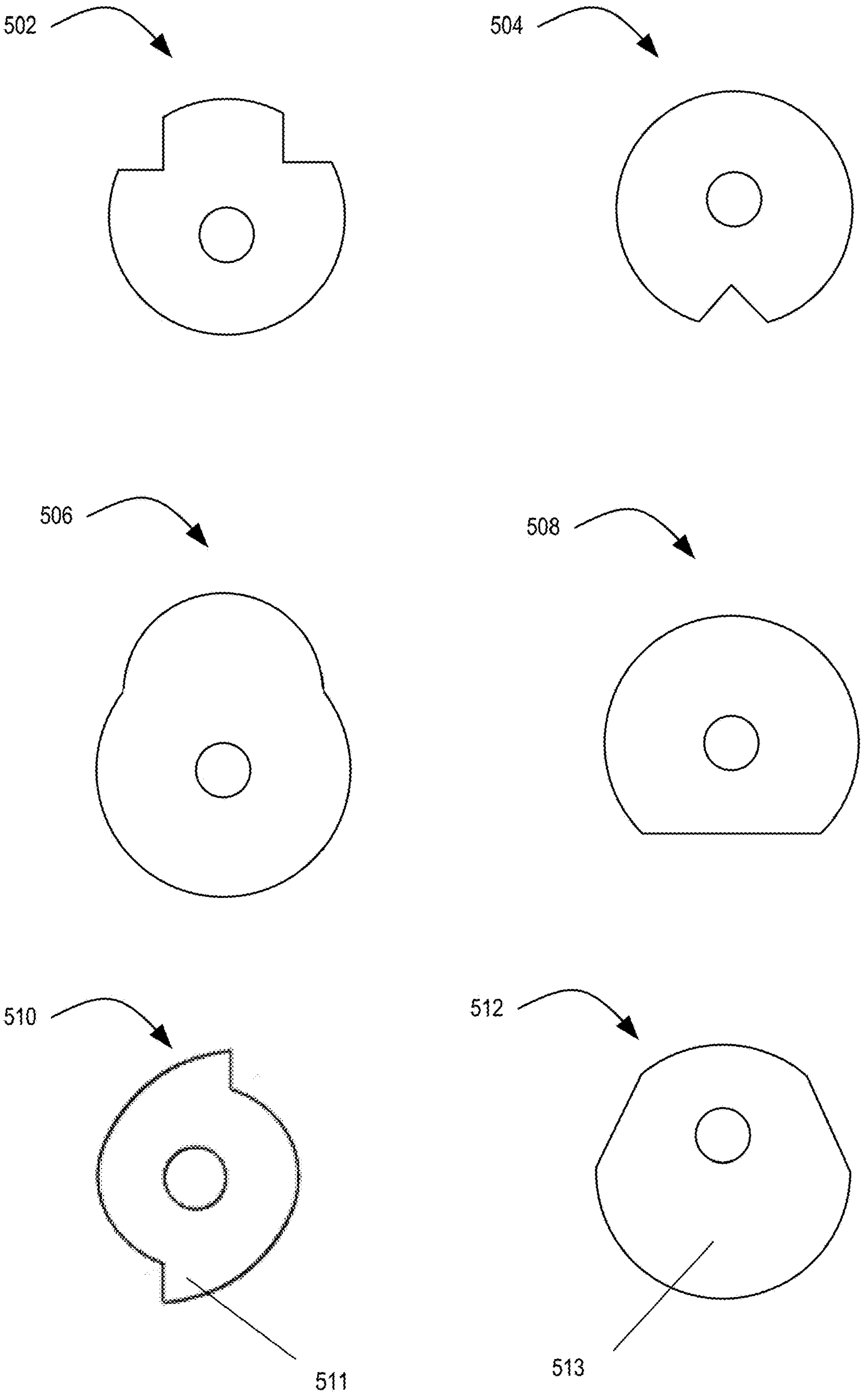
FIG. 5 illustrates various cam shapes in accordance with embodiments of the present disclosure.

For further explanation, FIG. 5 sets forth a variety of different cam shapes 502, 504, 506, 508, 510, 512, including examples of a wing 511 and a lobe 513 of a cam, in accordance with the present disclosure.

Figure 6:
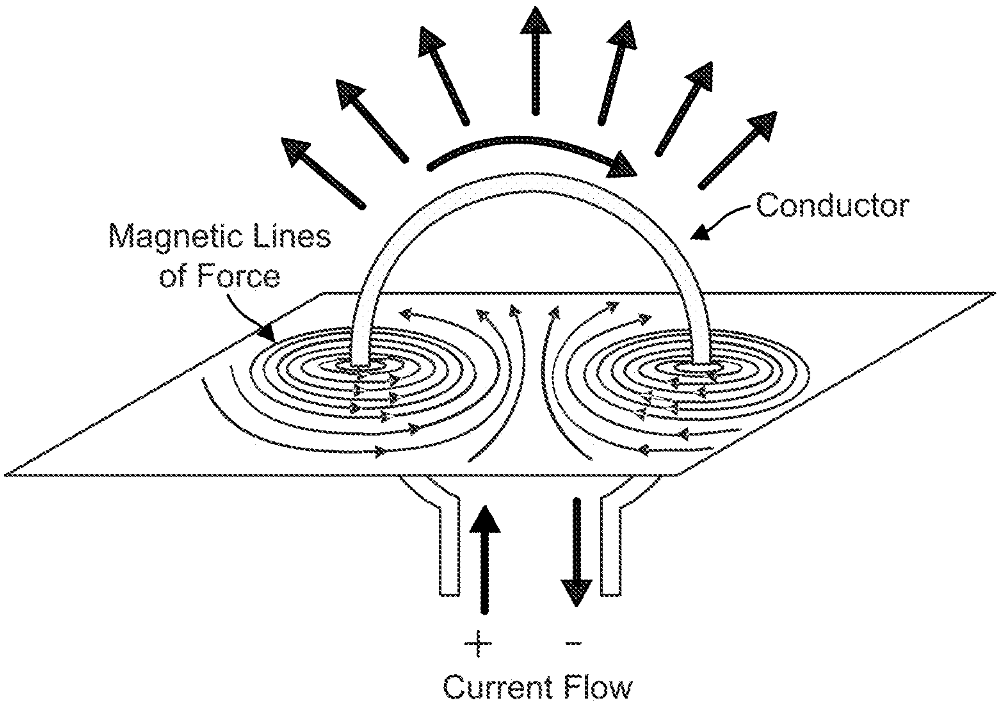
FIG. 6 illustrates Lorentz forces on a conductor in accordance with principles of the present disclosure.

For further explanation, FIG. 6 illustrates the effect of Lorentz forces on a bent conductor in accordance with principles of the present invention. When current passes through a conductor, Lorentz forces cause a repulsion force in the conductor. When the conductor is bent into a half loop, semicircle, or C-shape, as shown in FIG. 6, the conductor will try to enlarge to outside of the magnetic field when high current is fed through the conductor. In effect, the conductor is repulsive to itself.

Figure 7:
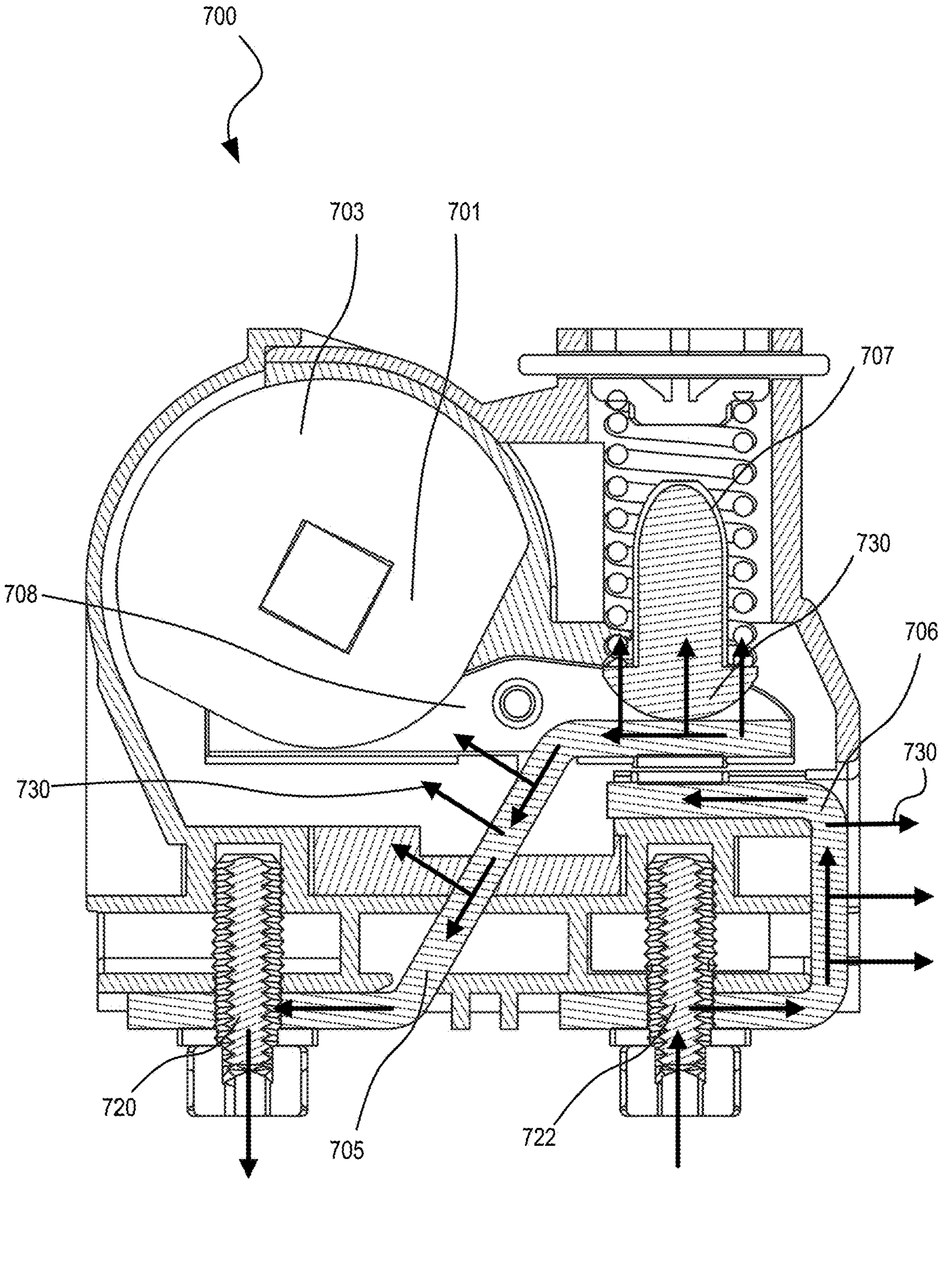
FIG. 7 sets forth a diagram of an example individual switch assembly for a multi-switch contactor assembly in accordance with at least one embodiment of the present disclosure.

For further explanation, FIG. 7 illustrates another example switch assembly 700 for multi-switch contactor assembly in accordance with at least one embodiment of the present invention. The switch assembly 700 is similar to the switch assemblies of FIG. 3 in that the switch assembly 700 includes a fixed bus bar 706, a deformable bus bar 705, a rotatable cam 701, and a rocker 708 that is fixed to one end of the deformable bus bar 705. The other end of the deformable bus bar 705 is coupled to a lead 720. As shown in FIG. 7, the switch assembly 700 is normally closed. The rocker 708 is spring loaded by spring 707 to hold the rocker 708 in the closed position such that spring forces acting on the rocker 708 cause the rocker 708 to bend the deformable bus bar 705 onto the fixed bus bar 706, thus making contact between a contact point on the deformable bus bar 705 and a contact point on an outer surface of the fixed bus bar 706. The other end of the fixed bus bar is coupled to a lead 722. In the closed state, the deformable bus bar 705 and the fixed bus bar 706 close a circuit between the leads 720, 722. To open the circuit, the cam 701 is rotated until a wing or lobe 703 forces the rocker 708 to rotate, thus compressing the spring 707 and bending the deformable bus bar 705 out of contact with the fixed bus bar 706.

The fixed bus bar 706 is generally C-shaped, or semicircular, and when the deformable bus bar 705 and the fixed bus bar 706 are in contact, they create a loop that bends back on itself, similar to the conductor shown in FIG. 6. Current passing through the fixed bus bar 706 and the deformable bus bar 705 causes a repulsive force, shown by force arrows 730, and causes the deformable bus bar 705 to enlarge to outside of the magnetic field. This effect reduces or inhibits the contact force between the fixed bus bar 706 and the deformable bus bar 705 because the deformable bus bar 705 is repulsed away from the fixed bus bar. As will be explained below, the placement of the deformable bus bar 705 with respect to the fixed bus bar 706 can be modified such that the Lorentz forces actually increases the contact force.

Figure 8A:
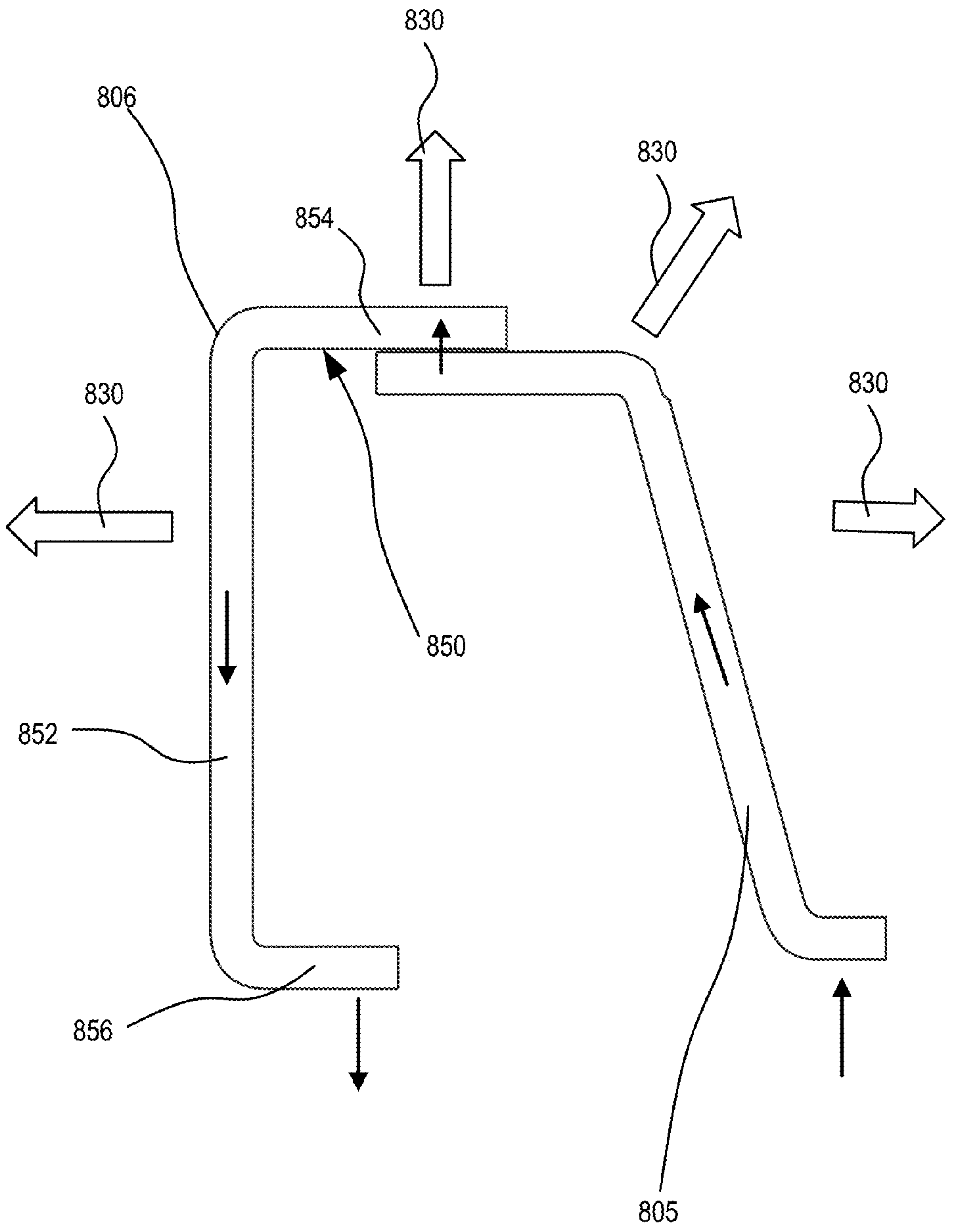
FIG. 8A sets forth a diagram of an example bus bar geometry for a multi-switch contactor assembly in accordance with at least one embodiment of the present disclosure.

For further explanation, FIG. 8A is a diagram of a fixed contact-moveable contact geometry for a multi-switch contactor assembly in accordance with at least one embodiment of the present disclosure. The example of FIG. 8A includes a deformable bus bar 805 and a fixed bus bar 806. The fixed bus bar 806 forms a partial loop and may generally be C-shaped or U-shaped in that the fixed bus bar includes two prong-like portions connected by a center portion. Thus, the fixed bus bar 806 includes an inner surface 850. As used in this disclosure, a 'C-shaped' bus bar generally refers to a bus bar having two connected prongs 854, 856 that are substantially parallel, where the connecting center portion 852 is generally orthogonal to the inner surfaces 850 of the prongs. In contrast to the previous examples, the deformable bus bar 805 is bent into contact with the inner surface 850 of the fixed bus bar 806 such that the Lorentz forces 830 are leveraged by the contact geometries to increase the contact force between the deformable bus bar 805 and the fixed bus bar 806. As current flows through the deformably bus bar 805 and the fixed bus bar 806, the resulting electromagnetic fields generate Lorentz forces 830 that act on the deformable bus bar 805 in the direction of the fixed bus bar 806 to hold the deformable bus bar 805 against the fixed bus bar 806, thereby increasing the contact force. In other examples, the fixed bus bar 806 may have a geometry other than 'C-shaped.' FIG. 8C is a diagram of a fixed contact-moveable contact geometry for a multi-switch contactor assembly in accordance with at least one embodiment of the present disclosure contactor geometry in which the fixed bus bar 890 is 'S-shaped.' Even though a bottom prong 896 is bent outwards in a direction opposite a top prong 895 (resulting in an "S-shape" bus bar) the Lorentz force will still create an increase of the contact force when current is running though the device.

Figure 8B:
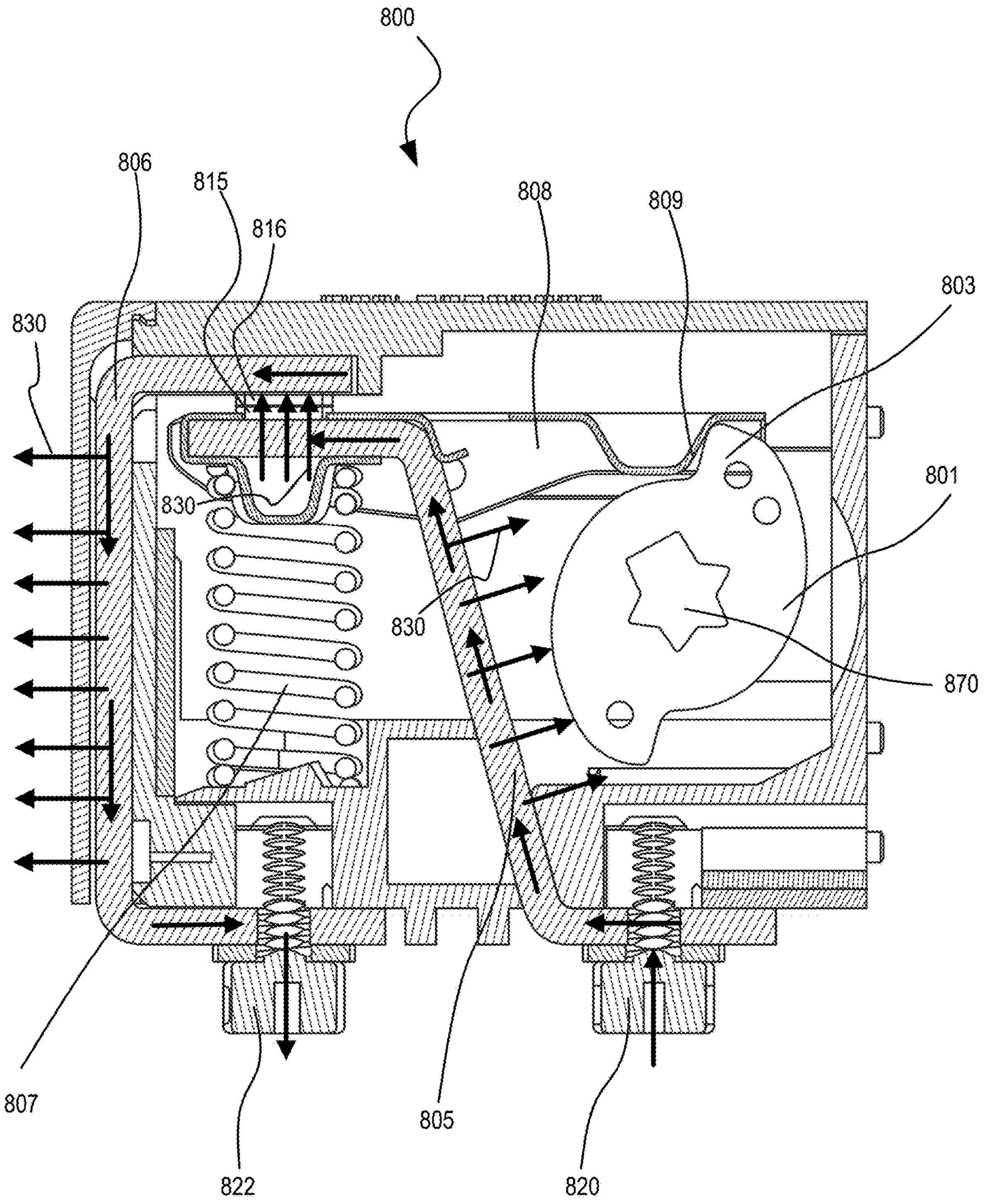
FIG. 8B sets forth a diagram of an example individual switch assembly for a multi-switch contactor assembly in accordance with at least one embodiment of the present disclosure.
Figure 8C:
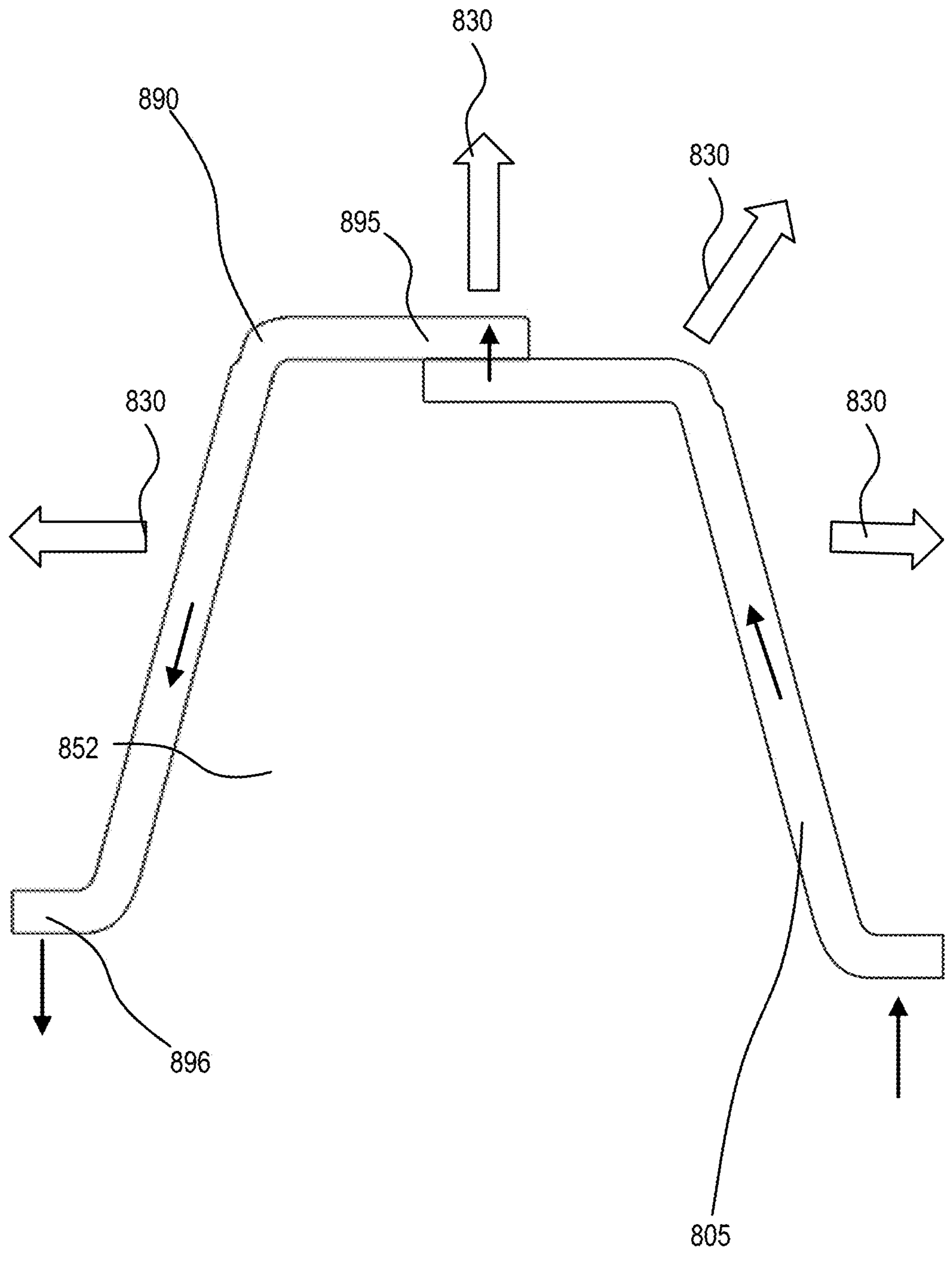
FIG. 8C sets forth a diagram of an example bus bar geometry for a multi-switch contactor assembly in accordance with at least one embodiment of the present disclosure.

For further explanation, FIG. 8B illustrates another example switch assembly 800 for multi-switch contactor assembly, in accordance with at least one embodiment of the present invention, that utilizes the contact geometry of FIG. 8A. In the previous examples (e.g., the example switch assemblies of FIG. 3 and FIG. 7), a rocker is actuated by a cam 801 to bend a deformable bus bar into contact with an outer surface of a C-shaped fixed bus bar. In contrast to those examples, the switch assembly 800 includes a deformable bus bar 805 that is bent into contact with an inner surface of a C-shaped fixed bus bar 806 such that the Lorentz forces are leveraged by the contact geometries to increase the contact force between the deformable bus bar 805 and the fixed bus bar 806. The fixed bus bar may be referred to as a partially looping bus bar in that the fixed bus bar 806 includes inner surfaces that face one another but the fixed bus bar does not form a complete physical loop.

In the example of FIG. 8B, the switch assembly 800 is a 'normally closed' switch in that the deformable bus bar 805 is in contact with the fixed bus bar 806 unless the rocker 808 is actuated to deform the deformable bus bar 805 such that contact between the deformable bus bar 805 and the fixed bus bar 806 is broken, thereby opening the switch. In some examples, the rocker 808 is spring loaded by spring 807 to hold the deformable bus bar 805 in contact with the fixed bus bar 806 unless a force applied to the rocker 808 by the cam 801 exceeds a spring force. In the example of FIG. 8B, a contact end 815 of the deformable bus bar 805 is attached to the rocker 808, and the rocker 808 is biased by spring 807. The other end of deformable bus bar 805 is coupled to lead 820. The force applied by the spring 807 to the rocker 808 holds the contact end 815 of the deformable bus bar 805 in contact with the inner surface 816 of the fixed bus bar 806. The other end of fixed bus bar 806 is coupled to lead 822.

The rocker 808 is actuated by rotation of an irregularly-shaped cam 801 (e.g., having the one of the cam shapes of FIG. 5) mounted on a cam shaft 870. When an actuation point 809 of the rocker 808 is engaged by an actuator portion 803 (e.g., a lobe or wing) of the cam 801 during cam rotation via the cam shaft 870, the rocker 308 rotates causing the spring 807 to compress and moving the deformable bus bar 805 out of contact with the fixed bus bar 806.

When the cam is further rotated or reverse rotated, the actuator portion 803 (e.g., a lobe or wing) of the cam 801 disengages the actuation point 809 of the rocker 808, thus allowing the spring 807 to decompress and force the rocker 808 to rotate backed to a closed state position, which bends the deformable bus bar 805 to the closed state position in which the deformable bus bar 805 contacts the inner surface 816 of the fixed bus bar 306. Rotation of the cam 801 opens and closes the switch depending on the rotation of a cam shaft and whether the rocker 808 is engaged by an actuator portion of the cam 801 (e.g., lobe or wing of the cam—there may be multiple wings or lobes). In alternative embodiments, switch assembly 800 may be arranged a 'normally open' switch in which the cam 801 actuates the rocker 808 to move the deformable bus bar 805 into contact with the fixed bus bar 806 to close the switch. In such arrangements, the lobe or wing of the cam 801 engages the rocker 808 to move the deformable bus bar 805 into contact with the inner surface 816 of the fixed bus bar. In some examples, the multi-switch contactor assembly 800 includes a position sensor (not shown) to detect the rotation of the cam shaft 870. The position sensor provides the absolute angle of the cam shaft such that the cam shaft can be rotated to a new setpoint to change switch states. The position sensor may be, for example, a non-contacting position sensor and a contacting device (e.g., a potentiometer). The signal of the position sensor is provided to a cam shaft motor controller for controlling the cam shaft position and communicated to a vehicle controller to indicate the state of the contacts.

In the example of FIG. 8B, the respective shapes and orientations of the bus bars or conductors in the configuration contactor contribute to an increase in the contact force 830 during a high current event. Current flowing through the deformable bus bar 805 and the fixed bus bar 806 (shown by the arrows in the bus bars) generates an electromagnetic field that induces Lorentz forces 830 (shown by the arrows projecting out from the bus bars 805, 806). The Lorentz force is used to partially compensate the levitation force that could open the contacts and cause sparking and welding. With the increase in contact force due to leveraging the Lorentz forces through geometries and orientations of the bus bars 805, 806, the spring force of the spring 807 can be reduced without compromising short circuit performance.

Some of the foregoing embodiments have been described in the context of a moveable contact in the form of a deformable bus bar. In other variations, the moveable contact of a switch may be a floating contact that is actuated to contact either a first fixed contact or a second fixed contact. In one example, one end of a floating moveable contact is disposed between the first fixed contact and the second fixed contact, while the other end of the floating moveable contact is actuatable by a cam having one or more actuation points (e.g., wings or lobes) as discussed above. For example, the moveable contact may be configured to rotate around a fixed point. When the cam is rotated in one direction, the moveable contact is actuated to rotate toward the first fixed contact. When the cam is further rotated or rotated in the opposite direction, the moveable contact is actuated to rotate toward the second fixed contact. Thus, the switch may have three states: closed on the first fixed contact, closed on the second fixed contact, or open. As discussed above, multiple such switches can be arrayed and actuated by respective cams mounted on a cam shaft, such that rotation of the cam shaft changes the states of the switches.

Some of the foregoing embodiments have been described in the context of a three-switch, i.e., three pole, configuration contactor in which switch state configurations include 1) direct connection to a first battery pack for powering the electric vehicle motor, 2) direct connection to a second battery pack for powering the electric vehicle motor, 3) series connection of two battery packs for powering the electric vehicle motor, and 4) parallel connection of the two battery packs for a charging configuration. However, other applications may need a different number of switches that are simultaneously driven by the cam shaft.

Figure 9:
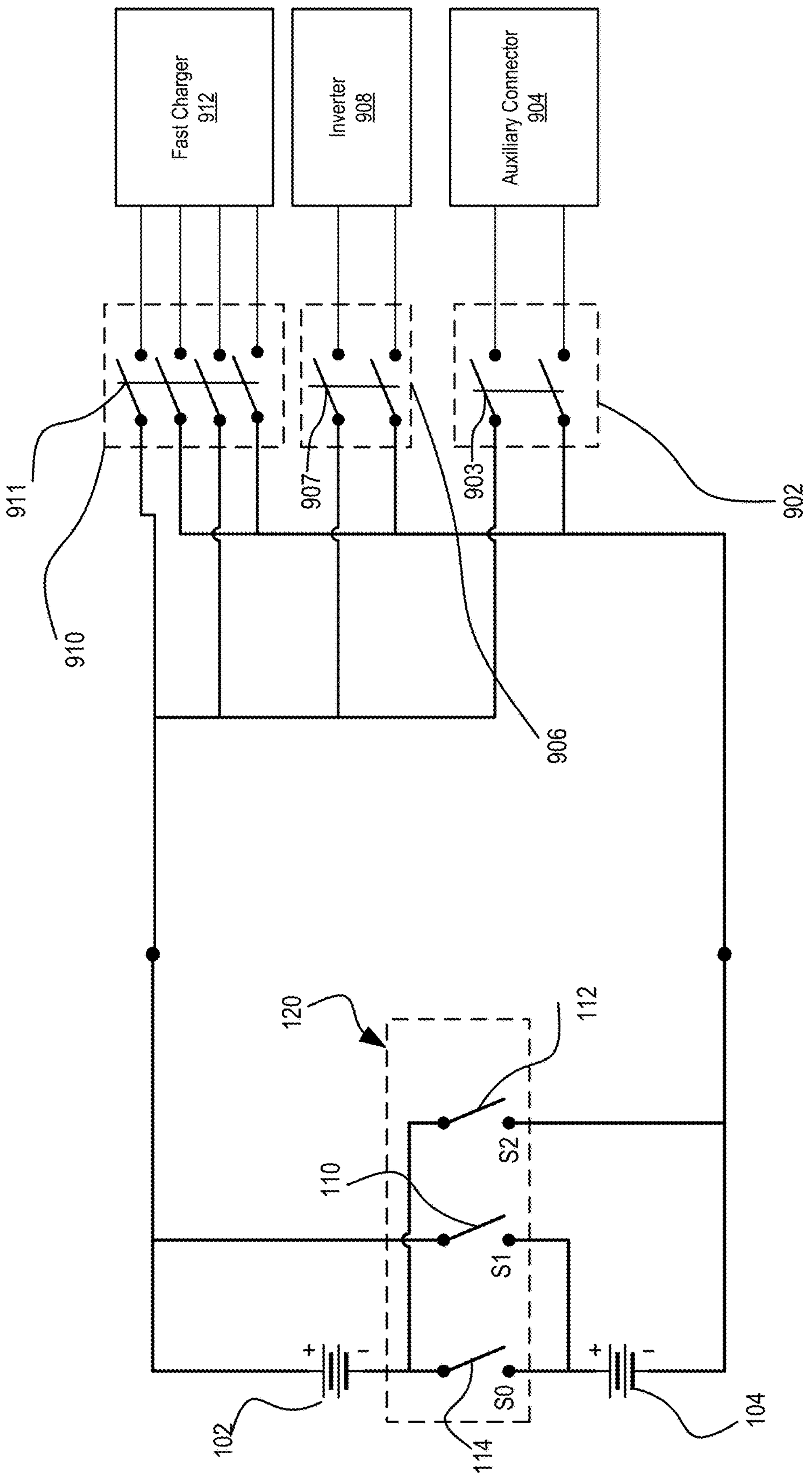
FIG. 9 sets forth a schematic of an example electric vehicle power distribution system in accordance with at least one embodiment of the present disclosure.

For further explanation, FIG. 9 illustrates a circuit diagram for an example power distribution system of an electric vehicle in accordance with at least one embodiment of the present invention. In the example of FIG. 9, an auxiliary contactor 902 for connecting a vehicle to grid subsystem 904 may require two poles. The poles 903 of the auxiliary contactor 902 are opened and closed at the same time via rotation of a single cam shaft to rotate multiple cams that actuate the switches between the open and closed states, as described above in the context of the configuration contactor of FIG. 3. A main contactor 906 to connect or disconnect the inverter 908 from the high-powered bus may require two poles. The poles 907 of the main contactor 906 are opened and closed at the same time via rotation of a single cam shaft to rotate multiple cams that actuate the switches between the open and closed states, as described above in the context of the configuration contactor of FIG. 3. A fast-charging contactor 910 for connecting a DCDC fast charging subsystem 912 may require two or more poles (e.g., 2 poles for currents up to 1000 A, 4 poles for currents of 2000 A, 6 poles for currents of 3000 A, etc.). The poles 911 of the fast-charging contactor 910 are opened and closed at the same time via rotation of a single cam shaft to rotate multiple cams that actuate the switches between the open and closed states, as described above in the context of the configuration contactor of FIG. 3.

Figure 10:
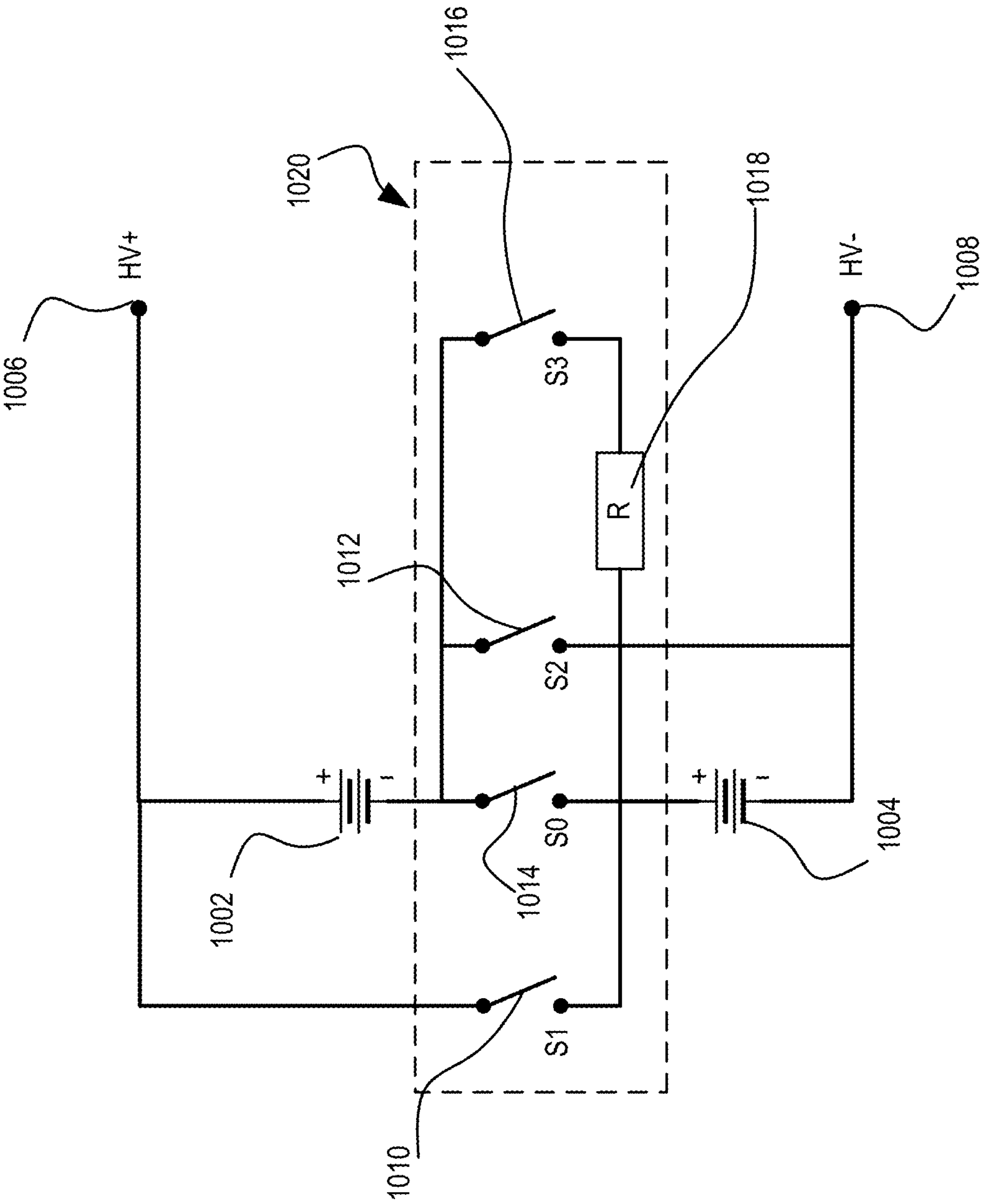
FIG. 10 is a circuit schematic for another multi-switch contactor assembly in accordance with at least one embodiment of the present disclosure.

For further explanation, FIG. 10 illustrates a configuration contactor circuit 1000 employing a multi-switch contactor assembly in accordance with at least one embodiment of the present disclosure. A configuration contactor using the configuration contactor circuit 1000 may be employed in an electric vehicle for connecting multiple battery packs to a vehicle power distribution system for driving the electric vehicle as well as for charging the battery packs. In this example, a first switch 1010 (also referred to herein as switch 'S1') is operable to open and close a connection between the positive terminal of a first battery pack 1004 and a positive terminal 1006 of a vehicle power distribution system. The negative terminal of the first battery pack 1004 is connected to a negative terminal 1008 of the vehicle power distribution system. In this example, a second switch 1012 (also referred to herein as switch 'S2') is operable to open and close a connection between the negative terminal of a second battery pack 1002 and the negative terminal 1008 of the vehicle power distribution system. A positive terminal of the second battery pack 1002 is connected to the positive terminal 1006 of the vehicle power distribution system. In this example, the third switch 1014 (also referred to herein as switch 'S0') is operable to open and close a series connection of the battery packs 1002, 1004. When the first switch 1010 is closed, the first battery pack 1004 is directly connected to the vehicle power distribution system. When the second switch 112 is closed, the second battery pack 1002 is directly connected to the vehicle power distribution system. When the first switch 1010 and the second switch 1012 are closed, both battery packs 1002, 1004 are connected in parallel to the vehicle power distribution system. When the third switch 1014 is closed, both battery packs 1002, 1004 are connected in series to the vehicle power distribution system.

In the example of FIG. 10, the configuration contactor circuit 1000 also includes a fourth switch 1016 (also referred to herein as switch 'S3') that is operable to open and close a series connection of a pre-charge resistor 1018 with the battery packs 1002, 1004. The pre-charge resistor 1018 gradually energizes a high voltage circuit before the main contactor or switch is closed. When dealing with high-voltage systems, the sudden closure of a switch or contactor can lead to inrush currents that may cause damage to the system. The pre-charge resistor helps mitigate these issues by reducing the inrush current of the circuit, allowing capacitors and other components to charge more gradually. In an initial state, the fourth switch ("pre-charge switch") 1016 is open, preventing the full voltage from being applied to the circuit. When the system is ready to be energized, the pre-charge switch closes, allowing a limited current to flow through the circuit. This limited current pre-charges the capacitors and other components. Once the pre-charge process is complete, the main contactor or switch is closed.

Closing either the first switch 1010 or the second switch 1012 while the third switch 1014 is closed may cause a direct short circuit of the battery packs 1002, 1004, which may weld the contactors of the switches and/or cause harm to the battery packs 1002, 1004. Closing either the first switch 1010, the second switch 1012, or the third switch 1014 while the fourth switch 1016 is closed will obviate the pre-charge resistor 1018, thus allowing a sudden inrush of current that could damage electrical components. Further, the pre-charging fourth switch 1016 should be closed before closing the third switch 1014 to connect the battery packs 1002, 1004 in series to apply the full voltage of the battery packs.

Thus, in accordance with at least one embodiment of the present disclosure, a configuration contactor utilizes a multi-switch contactor assembly 1020 in which switches S0, S1, S2, and S3 are mechanically linked to prevent switch S0 from being opened while switch S1 or switch S2 is closed, and vice versa, and to prevent switches S0, S1, and S2 from being closed while switch S3 is closed. A multi-switch contactor assembly 1020 in accordance with at least one embodiment of the present disclosure comprises an array of switches (e.g., switches S0, S1, S2, S3) including a first switch implemented by a first moveable contact and at least one first fixed contact, the first switch configured to change a switch state between an open state and a closed state for direct connection of a first battery pack. The multi-switch contactor assembly 1020 also includes a second switch implemented by a second moveable contact and at least one fixed second contact, the second switch configured to change a switch state between an open state and a closed state for direct connection of a second battery pack. The multi-switch contactor assembly 1020 also includes a third switch implemented by a third moveable contact and at least one third fixed contact, the third switch configured to change a switch state between an open state and a closed state for series connection of the first battery pack and the second battery pack. The multi-switch contactor assembly 1020 also includes a fourth switch implemented by a fourth moveable contact and at least one fourth fixed contact, the fourth switch configured to change a switch state between an open state and a closed state for connection of a pre-charge resistor. The multi-switch contactor assembly 1020 further includes an actuator assembly configured to actuate the first moveable contact, the second moveable contact, the third moveable contact, and the fourth moveable contact. The actuator assembly includes a shaft, wherein the respective switch states of the switches are mechanically linked and are changed in dependence upon rotation of the shaft. Although a multi-switch contactor assembly is described in the following examples as including four switches, the principles of the present disclosure are applicable to a multi-switch contactor assembly comprising fewer than four switches or more than four switches. That is, a single actuator is employed to change multiple switches to differing switch states such that some combinations of switch states are mechanically prohibited. As discussed above, mechanical linkage of the contactor switches can be achieved with low contact resistance, no levitation, no hold power, and high contact forces.

In some implementations, each switch of the multi-switch contactor assembly 1020 includes a fixed bus bar and a deformable bus bar (i.e., a moveable contact) that is coupled to a rocker mechanism. As discussed above with reference to FIGS. 3 and 8B, a switch is actuated by a rocker moving the deformable bus bar into an out of contact with the fixed bus bar. The rocker is actuated by rotation of a cam that is coupled to a cam shaft. Each switch is independently actuated by a respective cam, and all of the cams are mechanically linked by the cam shaft. Each cam may have a cam shape, such as the cam shapes in FIG. 5, that includes an actuator portion (e.g., a wing or lobe). These actuator portions are not aligned along the length of the cam shaft. Thus, the switch states of the four switches varies in dependence upon the angle of rotation of the cam shaft. In some examples, the fixed bus bar is implemented as a partial loop such as a C-shape, bracket-shape, or U-shape and the deformable bus bar contacts an inner surface of the fixed bus bar, as discussed above with reference to FIG. 8A, such that high current passing through the fixed bus bar and the deformable bus bar creates Lorentz forces that holds the deformable bus bar in contact with the fixed bus bar.

For further explanation, FIG. 11 sets forth a table 1100 of cam shaft angles and circuit states with respect to connection of the two battery packs and a pre-charge switch. In the example of FIG. 11, two 400V battery packs 'Bank A' and 'Bank B' of an electric vehicle are shown for illustrative purposes. Additional battery packs or alternative voltages may be employed without departing from embodiments of the present disclosure. Column 1101 in the table 1100 indicates the angle of rotation of the cam shaft. The angles shown in the table are provided for illustrative purposes; various implementations may use different angles based on cam shaft motor speed and isolation requirements. Column 1102 in the table 1100 indicates the high voltage circuit state. Column 1103 in the table 1100 indicates the switch state for direct connection of Bank A. Column 1104 in the table 1100 indicates switch state for series connection of Bank A and Bank B. Column 1105 in the table 1100 indicates switch state for direct connection of Bank B. Column 1106 in the table 1100 indicates switch state for connection of the pre-charge resistor. In the example of FIG. 11, when the cam shaft is at 0 degrees, the circuit state is 800V driving/charging and the switch to connect Bank A and Bank B in series is closed with all other switches being open. When the cam shaft is at 45 degrees or 315 degrees (forward or reverse 45 degrees from the 800V driving/charging state), the switch to connect the pre-charge resistor is closed and all other switches are open. When the cam shaft is at 90 degrees or 270 degrees (forward or reverse 90 degrees from the 800V driving/charging state), all switches are open. This ensures that all switches are open before entering the pre-charging state. When the cam shaft is at 135 degrees, the switch for direct connection of Bank A for 400V charging is closed and all other switches are open. When the cam shaft is at 180 degrees, the switch for direct connection of Bank A for 400V charging is closed and the switch for direct connection of Bank B for 400V charging is closed (i.e., parallel charging), and all other switches are open. When the cam shaft is at 225 degrees, the switch for direct connection of Bank B for 400V charging is closed and all other switches are open. Thus, whether going in the forward or reverse cam shaft rotation direction, the switch states are all open before transitioning to a single battery pack charging state and then to a parallel battery pack charging state, and before transitioning to the pre-charge state. In this way, switch state combinations that could lead to system damage are mechanically prevented.

Figure 12:
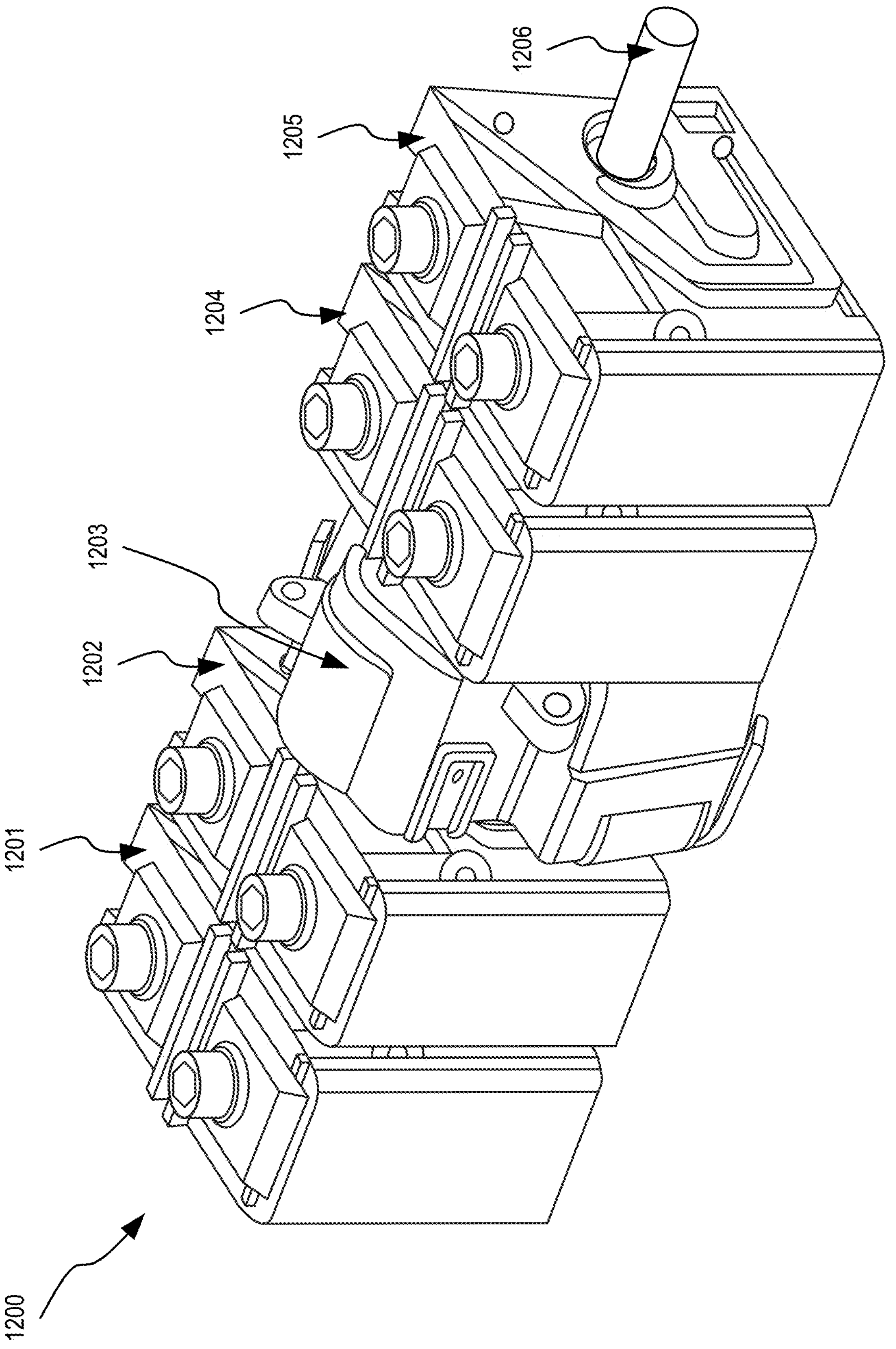
FIG. 12 sets forth an example multi-switch contactor assembly incorporating a pre-charge system in accordance with at least one embodiment of the present disclosure.

For further explanation, FIG. 12 sets forth perspective diagram of an example multi-switch contactor assembly 1200 with a pre-charge system. For example, the multi-switch contactor assembly 1200 may implement the multi-switch contactor assembly 1020 of FIG. 10. The multi-switch contactor assembly 1200 includes four contactors 1201, 1202, 1204, and 1205. By way of example and not limitation, with reference also to FIG. 10, contactor 1201 may implement switch S1, contactor 1202 may implement switch S2, contactor 1204 may implement switch S3, and contactor 1205 may implement switch S0. A driving motor 1203 is disposed between two of the contactors (e.g., between contactor 1202 and contactor 1204). A cam actuator shaft 1206 extends through contactors 1201, 1202, 1204, and 1205 and through motor 1203. The cam actuator shaft mechanically links the cams of each contactor 1201, 1202, 1204, and 1205 to prevent dangerous switch state combinations. Rotation of the cam shaft rotates each cam of each contactor 1201, 1202, 1204, and 1205.

Figure 13:
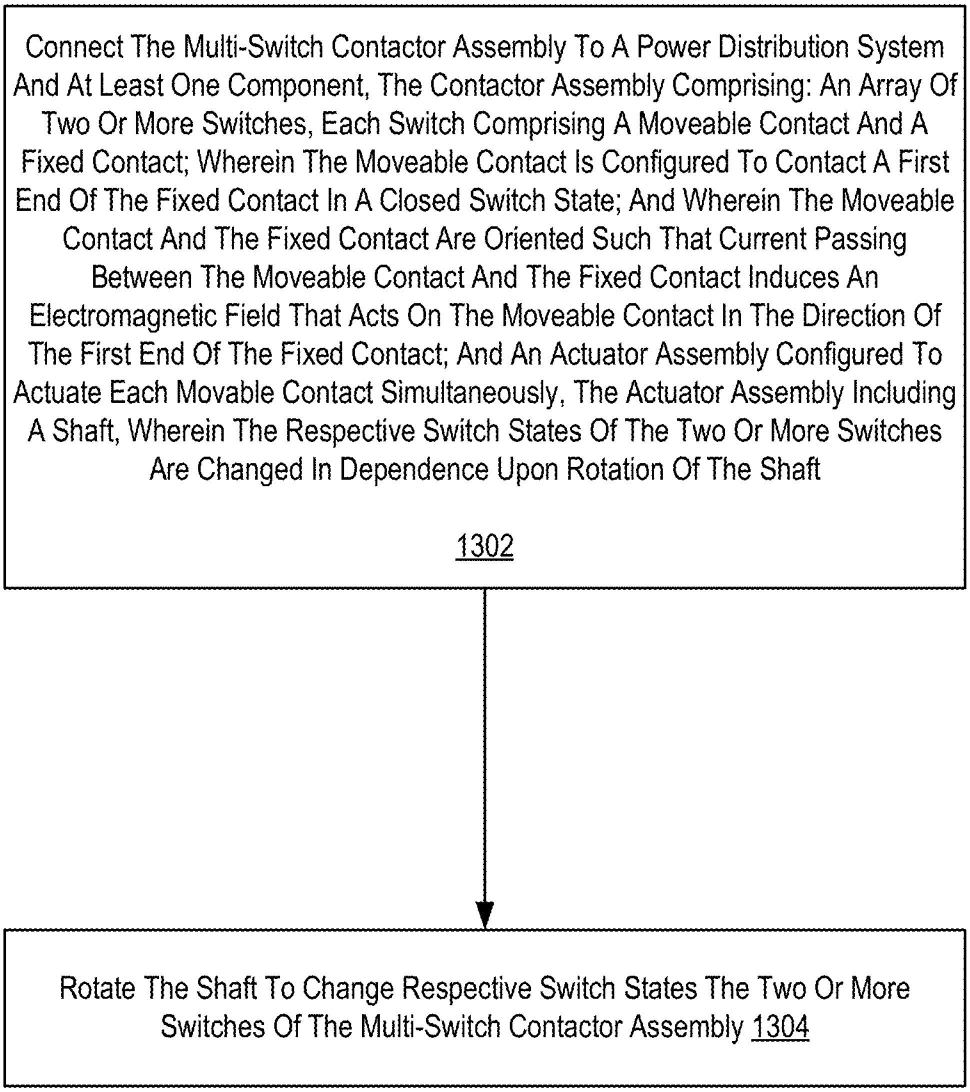
FIG. 13 is a flowchart of an example method of operating a multi-switch contactor assembly according to at least one embodiment of the present disclosure.

For further explanation, FIG. 13 sets forth a flow chart illustrating an example method of operating a multi-switch contactor assembly in accordance with at least one embodiment of the present disclosure. The method of FIG. 13 includes connecting 1302 the multi-switch contactor assembly to a power distribution system and at least one component. For example, the at least one component may be one or more battery packs or an inverter motor. In some examples, the contactor assembly may be any of the multi-switch contactor assemblies described above, in that the contactor assembly includes an array of two or more switches, each switch comprising a moveable contact and a fixed contact. The moveable contact is configured to contact a first end of the fixed contact in a closed switch state. The moveable contact and the fixed contact are oriented such that current passing between the moveable contact and the fixed contact induces an electromagnetic force that acts on the moveable contact in the direction of the first end of the fixed contact. The multi-switch contactor assembly further comprises an actuator assembly configured to actuate each movable contact simultaneously. The actuator assembly includes a shaft, wherein the respective switch states of the two or more switches are changed in dependence upon rotation of the shaft. For example, the two or more switches may be implemented by switch assemblies such as the switch assembly 800 that are disposed on the same actuator shaft. The contactor assembly may be, for example, the multi-switch contactor assembly 120 of FIG. 1 (e.g. a configuration contactor), the main contactor 906 of FIG. 9, the fast-charging contactor 910 of FIG. 9, the auxiliary contactor 902, or the multi-switch contactor assembly 1020 of FIG. 10 (e.g. a configuration contactor).

In some examples, at least one fixed contact includes a second end substantially parallel to the first end and middle portion substantially orthogonal to the first end and the second end. A contact portion of the moveable contact is oriented between the first end and the second end of the at least one fixed contact. The contact portion of the moveable contact is configured to contact an inner side of the first end that is opposite an inner side of the second end of the at least one fixed contact. In the presence of high current through the fixed contact in contact with the moveable contact, Lorentz forces acting on the moveable contact repel the moveable contact toward the fixed contact, thus increasing the contact force.

The method of FIG. 13 also includes rotating 1304 the shaft to change respective switch states of the two or more switches of the multi-switch contactor assembly, wherein particular combinations of switch states are mechanically prevented. Rotation of the cam shaft to change the switch states is described above. Rotation of the cam shaft rotates two or more cams. In each switch, a cam, depending on its rotational orientation, engages a rocker attached to the moveable contact and causes rotation of the rocker, which moves the moveable contact into or out of contact with the fixed contact. The cam shaft rotates multiple cams at the same time, which changes the switch states of the switches.

Figure 14:
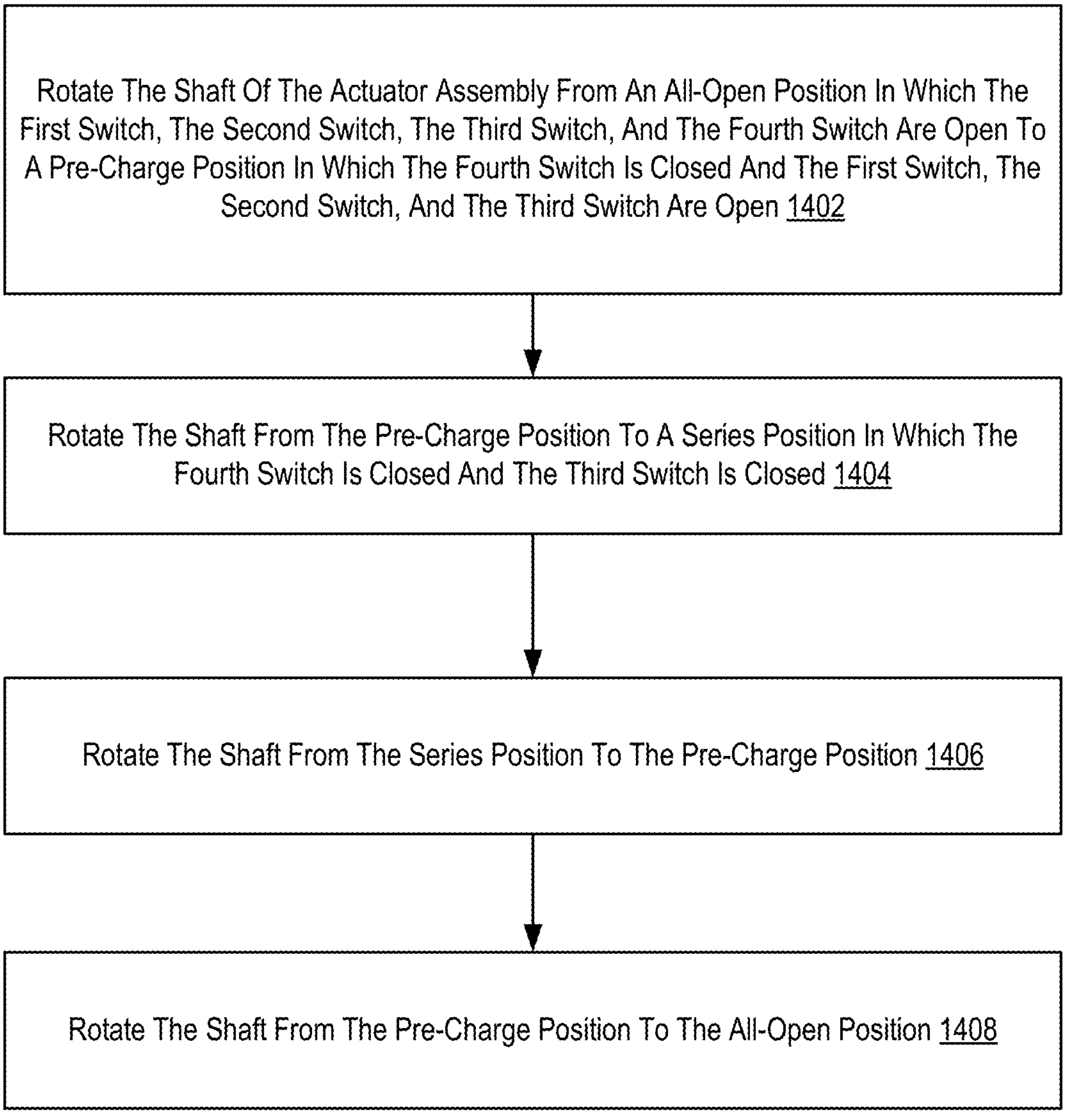
FIG. 14 is a flowchart of an example method of operating a multi-switch contactor assembly with a pre-charge system according to at least one embodiment of the present disclosure.

For further explanation, FIG. 14 sets forth a flow chart illustrating an example method of operating a multi-switch contactor assembly with a pre-charge system in accordance with at least one embodiment of the present disclosure. In the method of FIG. 14, the multi-switch contactor assembly further includes an array of switches. The assembly also includes an actuator assembly including a shaft and configured to actuate each switch of the array of switches. As explained above, rotation of the shaft of the multi-switch contactor assembly is used to change the states of the switches of the array of switches. In each switch of the array of switches, a cam (depending on its rotational orientation) engages a rocker attached to a moveable contact and causes rotation of the rocker, which moves the moveable contact into or out of contact with a fixed contact. Rotation of the shaft rotates multiple cams at the same time, which changes the switch states of the switches.

The array of switches includes a first switch configured to connect a first battery device to a circuit, a second switch configured to connect a second battery device to the circuit, a third switch configured to connect the first battery device and the second battery device in series to the circuit, and a fourth switch configured to connect a pre-charge resistor to at least one of the first battery device and the second battery device. For example, the switches may be implemented by switch assemblies such as the switch assembly 800 that are disposed on the same actuator shaft. The contactor assembly may be, for example, the multi-switch contactor assembly 1020 of FIG. 10 (e.g. a configuration contactor).

In this method embodiment, high current carrying main contacts (e.g., the contacts for the first battery and the second battery) are combined with lower current carrying pre-charge contacts in the same device in a way that the contactor actuator will be mechanically forced to go from the open state to the closed state of the main contacts via a pre-charge state where the pre-charge contact is closed first. As explained above, the pre-charge system is configured to gradually energize a high voltage circuit before the main contactor or switch is closed. When dealing with high-voltage systems, the sudden closure of a switch or contactor can lead to inrush currents that may cause damage to the system. The pre-charge switch and resistor help to mitigate these issues by reducing the inrush current of the circuit, allowing capacitors and other components to charge more gradually.

The method of FIG. 14 begins with rotating 1402 the shaft of the actuator assembly from an all-open position in which the first switch, the second switch, the third switch, and the fourth switch are open to a pre-charge position in which the fourth switch is closed and the first switch, the second switch, and the third switch are open. In this initial all-open position, the fourth switch is open, preventing the full voltage from being applied to the circuit. When the system is ready to be energized, the fourth switch closes, allowing a limited current to flow through the circuit. This limited current pre-charges the capacitors and other components. Once the pre-charge process is complete, the series switch is closed by rotating 1404 the shaft from the pre-charge position to a series position in which the fourth switch is closed and the third switch is closed. The method of FIG. 14 then includes rotating the shaft from the series position to the pre-charge position. The method of FIG. 14 also includes rotating the shaft from the pre-charge position to the all-open position.

Readers of skill in the art will realize that according to embodiments of the present invention, the rotation speed of the actuator may be selected such that it can be guaranteed by mechanical design that the system is always pre-charged before the main contact (e.g., the series connection) engages.

In view of the foregoing, it will be appreciated that the multi-switch contactor assemblies and battery configuration contactor described above provide a number of advantages, including the ability to configure two battery packs into serial and parallel states (e.g., one for driving and one for charging an electric vehicle), low contact resistance (e.g., less than 50μΩ per switch), high levitation withstand realized via appreciable contact force, a mitigation of risk of battery shorting due to loss of switching coordination or mechanical shock, the ability to manage voltage potential mismatch in battery packs, the ability to actively break tack welds, low hold power required for an actuated state, reduced switching noise, and an increase in contact force by leveraging Lorentz forces through conductor geometry and orientation. Further, a pre-charge switch is integrated within the multi-switch contactor assembly.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A multi-switch contactor assembly with a pre-charge system, the multi-switch contactor assembly comprising:
- an array of switches; and
- an actuator assembly configured to actuate each switch of the array of switches, the array of switches including:
  - a first switch configured to connect a first battery device to a circuit;
  - a second switch configured to connect a second battery device to the circuit;
  - a third switch configured to connect the first battery device and the second battery device in series to the circuit; and
  - a fourth switch configured to connect a pre-charge resistor to at least one of the first battery device and the second battery device.

2. The multi-switch contactor assembly of claim 1, wherein the pre-charge resistor is connectable in series between the first battery device and the second battery device via the fourth switch.

3. The multi-switch contactor assembly of claim 1 wherein each switch in the array of switches include a moveable contact and a fixed contact; wherein the moveable contact is configured to contact a first end of the fixed contact in a closed switch state; and wherein the moveable contact and the fixed contact are oriented such that current passing between the moveable contact and the fixed contact induces an electromagnetic force that acts on the moveable contact in the direction of the first end of the fixed contact.

4. The multi-switch contactor assembly of claim 3 wherein the actuator assembly is configured to actuate each movable contact simultaneously, the actuator assembly including a shaft, wherein the respective switch states of the array of switches are changed in dependence upon rotation of the shaft.

5. The multi-switch contactor assembly of claim 3, wherein the fixed contact is substantially C-shaped having an inner surface and an outer surface; and wherein the moveable contact is oriented to contact the inner surface of the fixed contact.

6. The multi-switch contactor assembly of claim 5, wherein the fixed contact includes a second end substantially parallel to the first end and a middle portion substantially orthogonal to the first end and the second end, wherein a contact portion of the moveable contact is oriented between the first end and the second end of the fixed contact; and wherein the contact portion of the moveable contact is configured to contact an inner surface of the first end that is opposite an inner surface of the second end of the fixed contact.

7. The multi-switch contactor assembly of claim 3, wherein a contact portion of the moveable contact is coupled to a rocker of the actuator assembly; and wherein the rocker is rotated in response to a cam of the actuator assembly to move the contact portion with respect to the first end of the fixed contact.

8. The multi-switch contactor assembly of claim 7, wherein the moveable contact is deformable; wherein the contact portion of the moveable contact is moved by bending the moveable contact; and wherein the rocker bends the moveable contact when the rocker is rotated.

9. The multi-switch contactor assembly of claim 3, wherein the fixed contact is substantially S-shaped; and wherein the moveable contact is oriented to contact an inner surface of a first prong of the fixed contact.

10. The multi-switch contactor assembly of claim 3, wherein passing currents through the moveable contact and the fixed contact generate Lorentz forces that increase a contact force between the moveable and the fixed contact.

11. The multi-switch contactor assembly of claim 4, wherein the actuator assembly includes two or more cams that are rotatable through rotation of the shaft, the two or more cams configured to respectively actuate the array of switches based on the rotation of the shaft.

12. The multi-switch contactor assembly of claim 11, wherein each of the two or more cams includes an actuation member, wherein the actuation members of at least two cams are unaligned along the shaft.

13. The multi-switch contactor assembly of claim 3, wherein each switch further comprises a second fixed contact; wherein the moveable contact is configured to contact the second fixed contact in a different closed switch state.

14. A system comprising:
- a plurality of components including a first battery device and a second battery device;
- a vehicle power distribution circuit; and
- a multi-switch contactor assembly connecting the plurality of components and the vehicle power distribution circuit, the multi-switch contactor assembly comprising:
  - an array of switches; and
  - an actuator assembly configured to actuate each switch of the array of switches, the array of switches including:
    - a first switch configured to connect the first battery device to a circuit;
    - a second switch configured to connect the second battery device to the circuit;
    - a third switch configured to connect the first battery device and the second battery device in series to the circuit; and
    - a fourth switch configured to connect a pre-charge resistor to at least one of the first battery device and the second battery device.

15. The system of claim 14, wherein plurality of components further includes an inverter, a fast-charging connector, and an auxiliary connector.

16. The system of claim 14, wherein the pre-charge resistor is connectable in series between the first battery device and the second battery device via the fourth switch.

17. The system of claim 14 wherein each switch in the array of switches include a moveable contact and a fixed contact; wherein the moveable contact is configured to contact a first end of the fixed contact in a closed switch state; and wherein the moveable contact and the fixed contact are oriented such that current passing between the moveable contact and the fixed contact induces an electromagnetic force that acts on the moveable contact in the direction of the first end of the fixed contact.

18. The system of claim 17 wherein the actuator assembly is configured to actuate each movable contact simultaneously, the actuator assembly including a shaft, wherein the respective switch states of the array of switches are changed in dependence upon rotation of the shaft.

19. The system of claim 17, wherein the fixed contact is substantially C-shaped having an inner surface and an outer surface; and wherein the moveable contact is oriented to contact the inner surface of the fixed contact.

20. A method for operating a multi-switch contactor assembly with a pre-charge system, the multi-switch contactor assembly further including an array of switches; and an actuator assembly including a shaft and configured to actuate each switch of the array of switches, the array of switches including:

a first switch configured to connect a first battery device to a circuit;

a second switch configured to connect a second battery device to the circuit;

a third switch configured to connect the first battery device and the second battery device in series to the circuit; and a fourth switch configured to connect a pre-charge resistor to at least one of the first battery device and the second battery device;

the method comprising:

rotating the shaft of the actuator assembly from an all-open position in which the first switch, the second switch, the third switch, and the fourth switch are open to a pre-charge position in which the fourth switch is closed and the first switch, the second switch, and the third switch are open;

rotating the shaft from the pre-charge position to a series position in which the fourth switch is closed and the third switch is closed;

rotating the shaft from the series position to the pre-charge position; and rotating the shaft from the pre-charge position to the all-open position.

* * * * *